United States Patent
Huang et al.

(10) Patent No.: US 12,333,288 B2
(45) Date of Patent: Jun. 17, 2025

(54) APPLICATION INSTALLATION METHOD AND ELECTRONIC DEVICE

(71) Applicant: HUAWEI TECHNOLOGIES CO., LTD., Guangdong (CN)

(72) Inventors: Dezhi Huang, Shenzhen (CN); Changle Qi, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 30 days.

(21) Appl. No.: 18/017,023

(22) PCT Filed: Jul. 15, 2021

(86) PCT No.: PCT/CN2021/106377
§ 371 (c)(1),
(2) Date: Jan. 19, 2023

(87) PCT Pub. No.: WO2022/017244
PCT Pub. Date: Jan. 27, 2022

(65) Prior Publication Data
US 2023/0289160 A1    Sep. 14, 2023

(30) Foreign Application Priority Data
Jul. 23, 2020   (CN) .......................... 202010713889.3

(51) Int. Cl.
*G06F 8/61*    (2018.01)
*G06F 8/70*    (2018.01)

(52) U.S. Cl.
CPC . *G06F 8/61* (2013.01); *G06F 8/70* (2013.01)

(58) Field of Classification Search
CPC .................................... G06F 8/61; G06F 8/70
See application file for complete search history.

(56) References Cited

U.S. PATENT DOCUMENTS 9,286,327 B2 *   3/2016   Kripalani ............ G06F 11/1469
10,007,501 B1 *  6/2018   Zhang ..................... H04L 67/34
(Continued)

FOREIGN PATENT DOCUMENTS

CN   104516754 A      4/2015
CN   105468417 A  *   4/2016
(Continued)

OTHER PUBLICATIONS

Lee et al., "A Data Mining Framework for Building Intrusion Detection Models", 2002, IEEE (Year: 2002).*
(Continued)

*Primary Examiner* — Wei Y Zhen
*Assistant Examiner* — Junchun Wu

(57) ABSTRACT

This application provides an application installation method and an electronic device. The method includes: detecting an operation of triggering installation of a first application and a second application by a user; in response to the operation, copying and scanning a first application package, where the first application package is an application package corresponding to the first application; copying and scanning a second application package in a first time period after the copying and scanning a first application package, where the second application package is an application package corresponding to the second application; and performing optimization on the first application in a second time period after the copying and scanning a first application package, where the first time period and the second time period at least partially overlap. According to technical solutions in embodiments of this application, an installation speed of installing a plurality of applications is increased.

12 Claims, 17 Drawing Sheets

(56) References Cited

U.S. PATENT DOCUMENTS

| | | | | |
|---|---|---|---|---|
| 2006/0225047 | A1* | 10/2006 | Brothers | G06F 9/5055 |
| | | | | 717/127 |
| 2007/0143446 | A1* | 6/2007 | Morris | G06F 8/61 |
| | | | | 709/219 |
| 2009/0113088 | A1* | 4/2009 | Illowsky | G06F 9/541 |
| | | | | 710/62 |
| 2009/0249313 | A1* | 10/2009 | Sobel | G06F 8/4441 |
| | | | | 717/140 |
| 2010/0306270 | A1* | 12/2010 | McDiarmid | G06F 8/61 |
| | | | | 718/1 |
| 2015/0026675 | A1* | 1/2015 | Csaszar | H04L 67/10 |
| | | | | 717/178 |
| 2016/0378458 | A1* | 12/2016 | Pan | G06F 8/61 |
| | | | | 717/169 |
| 2017/0102929 | A1* | 4/2017 | Lee | G06F 8/65 |
| 2017/0220335 | A1 | 8/2017 | Pink et al. | |
| 2018/0359390 | A1* | 12/2018 | Kawabata | G06F 8/61 |
| 2019/0373320 | A1 | 12/2019 | Balsamo | |
| 2020/0150943 | A1 | 5/2020 | Singh et al. | |
| 2023/0300415 | A1* | 9/2023 | Balsamo | H04N 21/4516 |
| | | | | 725/139 |

FOREIGN PATENT DOCUMENTS

| | | | | | |
|---|---|---|---|---|---|
| CN | 106681773 | A | | 5/2017 | |
| CN | 106708507 | A | * | 5/2017 | G06F 8/61 |
| CN | 108228200 | A | | 6/2018 | |
| CN | 108595192 | A | * | 9/2018 | G06F 8/61 |
| CN | 109976645 | A | | 7/2019 | |
| CN | 110083367 | A | * | 8/2019 | G06F 8/61 |
| CN | 110147240 | A | * | 8/2019 | G06F 8/427 |
| CN | 110162311 | A | | 8/2019 | |
| CN | 111309341 | A | | 6/2020 | |
| CN | 111435318 | A | | 7/2020 | |
| CN | 107861730 | B | | 10/2020 | |
| CN | 112799687 | A | * | 5/2021 | G06F 8/30 |
| CN | 113971034 | A | * | 1/2022 | G06F 8/61 |
| CN | 111240766 | B | * | 12/2023 | G06F 8/61 |
| WO | 2018018702 | A1 | | 2/2018 | |

OTHER PUBLICATIONS

Edelstein et al., "Advanced methods of microscope control using µManager software", Jan. 2015, NIH (Year: 2015).*

Beguelin et al., "Application Level Fault Tolerance in Heterogeneous Networks of Workstations", 1997, Journal of Parallel and Distributed Computing (Year: 1997).*

Spyropoulos et al., "Efficient Routing in Intermittently Connected Mobile Networks: The Multiple-Copy Case", Feb. 2008, vol. 16, No. 1 (Year: 2008).*

* cited by examiner

APPLICATION INSTALLATION METHOD AND ELECTRONIC DEVICE

CROSS-REFERENCE TO RELATED APPLICATIONS

This application is a National Stage of International Application No. PCT/CN2021/106377, filed on Jul. 15, 2021, which claims priority to Chinese Patent Application No. 202010713889.3, filed on Jul. 23, 2020, both of which are hereby incorporated by reference in their entireties.

TECHNICAL FIELD

This application relates to the field of electronic technologies, and in particular, to an application installation method and an electronic device.

BACKGROUND

When an application (application, App) is installed on an electronic device, there are generally an upper-layer installation process and a bottom-layer optimization process. For example, when apps are installed in batches or a plurality of apps are restored by using a cloned backup on the electronic device, it means that a large quantity of apps need to be installed. Because upper-layer installation processes and bottom-layer optimization processes of the plurality of apps are sequentially performed, and the bottom-layer optimization processes of the apps take a long time, the whole installation processes are time-consuming, and user experience is reduced.

Therefore, how to quickly and efficiently install the apps in batches becomes a technical problem that needs to be resolved.

SUMMARY

This application provides an application installation method and an electronic device, to help improve an installation speed of installing a plurality of applications on the electronic device, so as to improve user experience.

According to a first aspect, an application installation method is provided. The method is applied to an electronic device. The method includes: detecting an operation of triggering installation of a first application and a second application by a user; in response to the operation, copying and scanning a first application package, where the first application package is an application package corresponding to the first application; copying and scanning a second application package in a first time period after the copying and scanning a first application package, where the second application package is an application package corresponding to the second application; and performing optimization on the first application in a second time period after the copying and scanning a first application package, where the first time period and the second time period at least partially overlap.

Based on the technical solution, when an application is installed on the electronic device, an upper-layer installation process and a bottom-layer optimization process of the application are performed in parallel. This helps improve an installation speed of installing a plurality of applications on the electronic device, thereby improving user experience.

With reference to the first aspect, in some implementations of the first aspect, the method further includes: detecting an operation of triggering installation of a third application and a fourth application by the user; and copying and scanning a third application package in a third time period after the copying and scanning a first application package, where the third application package is an application package corresponding to the third application, and when duration of the second time period is greater than a sum of duration of the first time period and duration of the third time period, a start moment at which a fourth application package is copied and scanned is later than or equal to a start moment at which optimization is performed on the second application.

Based on the technical solution, when execution duration of a bottom-layer optimization process of an application is long, the technical solution helps avoid overstocking of excessive optimization tasks in a bottom-layer optimization queue.

With reference to the first aspect, in some implementations of the first aspect, the method further includes: detecting an operation of triggering installation of a third application by the user; when copying and scanning of the second application package are completed, detecting a temperature of a central processing unit CPU of the electronic device; determining that the temperature is greater than or equal to a preset value; pausing for first preset duration when optimization of the second application ends; and copying and scanning a third application package after the first preset duration, where the third application package is an application package corresponding to the third application.

Based on the technical solution, in a process of installing the plurality of applications, a temperature of the electronic device is monitored, and when the temperature of the electronic device is excessively high, a bottom-layer optimization task is stopped for a period of time. This helps reduce a phenomenon that the temperature of the electronic device is excessively high for a short time.

Based on the technical solution, when the temperature of the electronic device is abnormal, an optimization task that is currently being executed is not stopped immediately, but is stopped for the period of time after it is completely executed. This helps avoid a problem of insufficient application stability of the electronic device.

With reference to the first aspect, in some implementations of the first aspect, before the performing optimization on the first application, optimization is performed on a fourth application, and the determining that the temperature is greater than or equal to a preset value includes: determine that the temperature is greater than or equal to the preset value and that duration of a fourth time period is greater than or equal to second preset duration, where the fourth time period is the same as the second time period, or when a time interval between the second time period and a fifth time period is less than or equal to third preset duration, the fourth time period is a sum of the second time period and the fifth time period, and the fifth time period is a time period in which the electronic device performs optimization on the fourth application.

Based on the technical solution, when the temperature of the electronic device is abnormal, it is determined whether the bottom-layer optimization task has been executed for a long time. The solution helps determine whether a temperature abnormality of the electronic device is caused by bottom-layer application optimization.

With reference to the first aspect, in some implementations of the first aspect, the performing optimization on the first application in a second time period after the copying and scanning a first application package includes: adding a first optimization task to a first task queue, where the first optimization task is used to optimize the first application;

starting a first thread, where the first thread is used to fetch the first optimization task from the first task queue; and invoking a first interface, where the first interface is used to start a second thread, and the second thread is used to execute the first optimization task.

In the technical solution, when applications are installed in batches on the electronic device, an optimization task corresponding to an application can be placed in a task queue, and the first thread manages and schedules the task queue, that is, the first thread fetches the optimization task from the task queue. In this case, the first interface is invoked to start the second thread to actually execute the optimization task of the application. In this way, bottom-layer optimization of the application does not affect upper-layer installation of the application, that is, an upper-layer installation process and a bottom-layer optimization process of the application can be implemented in parallel. This can increase an installation speed of batch applications, and improve user experience.

According to a second aspect, an electronic device is provided, including one or more processors and one or more memories. The one or more memories store one or more computer programs, and the one or more computer programs includes instructions. When the instructions are executed by the one or more processors, the electronic device is enabled to perform the following steps: detecting an operation of triggering installation of a first application and a second application by a user; in response to the operation, copying and scanning a first application package, where the first application package is an application package corresponding to the first application; copying and scanning a second application package in a first time period after the copying and scanning a first application package, where the second application package is an application package corresponding to the second application; and performing optimization on the first application in a second time period after the copying and scanning a first application package, where the first time period and the second time period at least partially overlap.

With reference to the second aspect, in some implementations of the second aspect, when the instructions are executed by the one or more processors, the electronic device is enabled to perform the following steps: detecting an operation of triggering installation of a third application and a fourth application by the user; and copying and scanning a third application package in a third time period after the copying and scanning a first application package, where the third application package is an application package corresponding to the third application, and when duration of the second time period is greater than a sum of duration of the first time period and duration of the third time period, a start moment at which a fourth application package is copied and scanned is later than or equal to a start moment at which optimization is performed on the second application.

With reference to the second aspect, in some implementations of the second aspect, when the instructions are executed by the one or more processors, the electronic device is enabled to perform the following steps: detecting an operation of triggering installation of a third application by the user; when copying and scanning of the second application package are completed, detecting a temperature of a CPU of the electronic device; determining that the temperature is greater than or equal to a preset value; pausing for first preset duration when optimization of the second application ends; and copying and scanning a third application package after the first preset duration, where the third application package is an application package corresponding to the third application.

With reference to the second aspect, in some implementations of the second aspect, before the performing optimization on the first application, optimization is performed on a fourth application, and the electronic device is specifically configured to: determine that the temperature is greater than or equal to the preset value and that duration of a fourth time period is greater than or equal to second preset duration, where the fourth time period is the same as the second time period, or when a time interval between the second time period and a fifth time period is less than or equal to third preset duration, the fourth time period is a sum of the second time period and the fifth time period, and the fifth time period is a time period in which the electronic device performs optimization on the fourth application.

With reference to the second aspect, in some implementations of the second aspect, the electronic device is specifically configured to: add a first optimization task to a first task queue, where the first optimization task is used to optimize the first application; start a first thread, where the first thread is used to fetch the first optimization task from the first task queue; and invoke a first interface, where the first interface is used to start a second thread, and the second thread is used to execute the first optimization task.

According to a third aspect, a computer-readable storage medium is provided. The computer-readable storage medium stores computer instructions. When the computer instructions are run on an electronic device, the electronic device is enabled to perform the application installation method according to any one of the first aspect and the possible implementations of the first aspect.

According to a fourth aspect, a computer program product is provided. When the computer program product runs on a computer, the computer is enabled to perform the application installation method according to any one of the first aspect and the possible implementations of the first aspect.

DESCRIPTION OF EMBODIMENTS

The following describes the technical solutions in embodiments of this application with reference to the accompanying drawings in embodiments of this application. In descriptions in embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions in embodiments of this application, "a plurality of" means two or more.

The terms "first" and "second" mentioned below are merely intended for a purpose of description, and shall not be understood as an indication or implication of relative importance or implicit indication of a quantity of indicated technical features. Therefore, a feature limited by "first" or "second" may explicitly or implicitly include one or more features.

An application installation method provided in embodiments of this application may be applied to an electronic device, for example, a mobile phone, a tablet computer, a wearable device, a vehicle-mounted device, an augmented reality (augmented reality, AR)/virtual reality (virtual reality, VR) device, a notebook computer, an ultra-mobile personal computer (ultra-mobile personal computer, UMPC), a netbook, or a personal digital assistant (personal digital assistant, PDA). A specific type of the electronic device is not limited in embodiments of this application.

Figure 1:
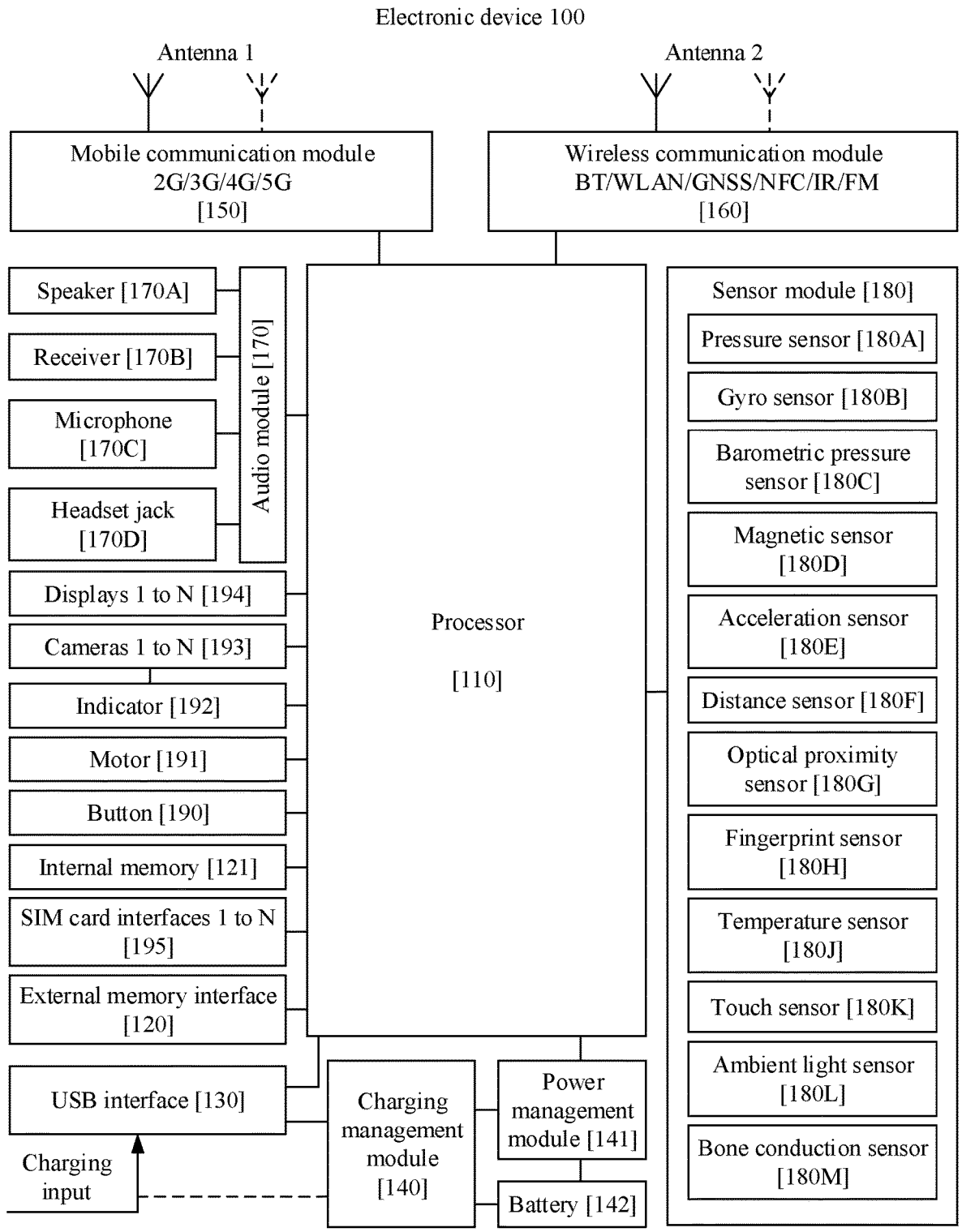
FIG. 1 is a schematic diagram of a structure of an electronic device 100 applicable to an embodiment of this application.

For example, FIG. 1 is a schematic diagram of a structure of an electronic device 100. The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identity module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application constitutes no specific limitation on the electronic device 100. In some other embodiments of this application, the electronic device 100 may include more or fewer components than those shown in the figure, some components may be combined, or some components may be split, or there may be a different component layout. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may be a nerve center and a command center of the electronic device 100. The controller may generate an operation control signal based on an instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access and reduces a waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes one serial data line (serial data line, SDA) and one serial clock line (serial clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a Bluetooth headset.

The PCM interface may be also configured to perform audio communication, and sample, quantize, and encode an analog signal. In some embodiments, the audio module 170 may be coupled to the wireless communication module 160 through a PCM bus interface. In some embodiments, the audio module 170 may also transmit an audio signal to the wireless communication module 160 through the PCM interface, to implement a function of answering a call through a Bluetooth headset. Both the I2S interface and the PCM interface may be used for audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music through a Bluetooth headset.

The MIPI interface may be configured to connect the processor 110 to a peripheral component, for example, the display 194 or the camera 193. The MIPI interface includes a camera serial interface (camera serial interface, CSI), a display serial interface (display serial interface, DSI), and the like. In some embodiments, the processor 110 communicates with the camera 193 through the CSI, to implement a photographing function of the electronic device 100. The processor 110 communicates with the display 194 through the DSI interface, to implement a display function of the electronic device 100.

The GPIO interface may be configured by using software. The GPIO interface may be configured as a control signal or a data signal. In some embodiments, the GPIO interface may be configured to connect the processor 110 to the camera 193, the display 194, the wireless communication module 160, the audio module 170, the sensor module 180, or the like. The GPIO interface may be alternatively configured as an I2C interface, an I2S interface, a UART interface, a MIPI interface, or the like.

The USB interface 130 is an interface that conforms to a USB standard specification, and may be specifically a mini USB interface, a micro USB interface, a USB type-C interface, or the like. The USB interface 130 may be configured to connect to a charger to charge the electronic device 100, or may be configured to transmit data between the electronic device 100 and a peripheral device. The USB interface 130 may be alternatively configured to connect to a headset, to play audio through the headset. The interface may be alternatively configured to connect to another electronic device, for example, an AR device.

It may be understood that an interface connection relationship between the modules illustrated in this embodiment of this application is merely an example for description, and constitutes no limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from a charger. The charger may be a wireless or wired charger. In some embodiments of wired charging, the charging management module 140 may receive a charging input of a wired charger through the USB interface 130. In some embodiments of wireless charging, the charging management module 140 may receive a wireless charging input through a wireless charging coil of the electronic device 100. When charging the battery 142, the charging management module 140 may further supply power to the electronic device by using the power management module 141.

The power management module 141 is configured to connect the battery 142 and the charging management module 140 to the processor 110. The power management module 141 receives an input from the battery 142 and/or the charging management module 140, to supply power to the processor 110, the internal memory 121, an external memory, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may be alternatively disposed in the processor 110. In some other embodiments, the power management module 141 and the charging management module 140 may be alternatively disposed in a same component.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a solution that is applied to the electronic device 100 and that includes wireless communication such as 2G, 3G, 4G, and 5G. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering and amplification on the received electromagnetic wave, and transmit a processed electromagnetic wave to the modem processor for demodulation. The mobile communication module 150 may further amplify a signal modulated by the modem processor, and convert an amplified signal into an electromagnetic wave for radiation through the antenna 1. In some embodiments, at least some function modules of the mobile communication module 150 may be disposed in the processor 110. In some embodiments, at least some function modules of the mobile communication module 150 may be disposed in a same component as at least some modules of the processor 110.

The modem processor may include a modulator and a demodulator. The modulator is configured to modulate a to-be-sent low-frequency baseband signal into a medium/high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by an audio device (which is not limited to the speaker 170A, the receiver 170B, or the like), or displays an image or a video by the display 194. In some embodiments, the modem processor may be an independent component. In some other embodiments, the modem processor may be independent of the processor 110, and is disposed in a same component as the mobile communication module 150 or another function module.

The wireless communication module 160 may provide a solution that is applied to the electronic device 100 and that includes wireless communication such as a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near-field communication, NFC), and an infrared (infrared, IR) technology. The wireless communication module 160 may be one or more components integrating at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert a processed signal into an electromagnetic wave for radiation through the antenna 2.

In some embodiments, in the electronic device 100, the antenna 1 and the mobile communication module 150 are coupled, and the antenna 2 and the wireless communication module 160 are coupled, so that the electronic device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time division-synchronous code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The electronic device 100 implements a display function by using the GPU, the display 194, the application processor, and the like. The GPU is a microprocessor for image processing, and is connected to the display 194 and the application processor. The GPU is configured to perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini-LED, a micro-LED, a micro-OLED, quantum dot light-emitting diodes (quantum dot light emitting diodes, QLEDs), or the like. In some embodiments, the electronic device 100 may include one or N displays 194, where N is a positive integer greater than 1.

The electronic device 100 may implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a light-sensitive element of the camera through a lens. An optical signal is converted into an electrical signal, and the light-sensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected to the light-sensitive element. The light-sensitive element may be a charge-coupled device (charge-coupled device, CCD) or a complementary metal-oxide-semiconductor (complementary metal-oxide-semiconductor, CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format, for example, RGB or YUV. In some embodiments, the electronic device 100 may include one or N cameras 193, where N is a positive integer greater than 1.

The digital signal processor is configured to process a digital signal, and may further process another digital signal in addition to a digital image signal. For example, when the electronic device 100 selects a frequency, the digital signal processor is configured to perform Fourier transform and the like on frequency energy.

The video codec is configured to compress or decompress a digital video. The electronic device 100 may support one or more video codecs. In this way, the electronic device 100 can play or record videos in a plurality of encoding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a mode of transfer between human brain neurons, and may further continuously perform self-learning. Applications such as intelligent cognition of the electronic device 100 may be implemented by using the NPU, for example, image recognition, facial recognition, speech recognition, and text understanding.

The external memory interface 120 may be configured to connect to an external storage card, for example, a micro SD card, to extend a storage capability of the electronic device 100. The external storage card communicates with the processor 110 through the external memory interface 120, to implement a data storage function. For example, files such as music and a video are stored in the external storage card.

The internal memory 121 may be configured to store computer-executable program code. The executable program code includes instructions. The processor 110 runs the instructions stored in the internal memory 121, to perform various function applications of the electronic device 100 and data processing. The internal memory 121 may include a program storage area and a data storage area. The program storage area may store an operating system, an application required by at least one function (for example, a voice playing function or an image playing function), and the like. The data storage area may store data (such as audio data and a phone book) created during use of the electronic device 100, and the like. In addition, the internal memory 121 may include a high-speed random access memory, and may further include a non-volatile memory, for example, at least one magnetic disk storage component, a flash memory, or a universal flash storage (universal flash storage, UFS).

The electronic device 100 may implement an audio function, for example, music playing or recording, by using the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to encode and decode an audio signal. In some embodiments, the audio module 170 may be disposed in the processor 110, or some function modules of the audio module 170 are disposed in the processor 110.

The speaker 170A, also referred to as a "loudspeaker", is configured to convert an electrical audio signal into a sound signal. The electronic device 100 may be used to listen to music or answer a call in a hands-free mode by using the speaker 170A.

The receiver 170B, also referred to as an "earpiece", is configured to convert an electrical audio signal into a sound signal. When a call is answered or audio information is listened to by using the electronic device 100, the receiver 170B may be put close to a human ear to listen to a voice.

The microphone 170C, also referred to as a "mike" or a "mic", is configured to convert a sound signal into an electrical signal. When making a call or sending a voice information, a user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may be alternatively disposed in the electronic device 100, to collect a sound signal, implement noise reduction, and identify a sound source, so as to implement a directional recording function and the like.

The headset jack 170D is configured to connect to a wired headset. The headset jack 170D may be a USB interface 130, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and may convert the pressure signal into an electrical signal.

The gyro sensor 180B may be configured to determine a motion posture of the electronic device 100. The barometric pressure sensor 180C is configured to measure barometric pressure. The magnetic sensor 180D includes a Hall sensor. The electronic device 100 may detect opening or closing of a flip cover by using the magnetic sensor 180D. The acceleration sensor 180E may detect magnitude of accelerations in various directions (generally on three axes) of the electronic device 100.

The distance sensor 180F is configured to measure a distance. The electronic device 100 may measure the distance in an infrared manner or a laser manner.

The optical proximity sensor 180G may include, for example, a light-emitting diode (LED) and an optical detector, for example, a photodiode. The light-emitting diode may be an infrared light-emitting diode. The electronic device 100 emits infrared light by using the light-emitting diode. The electronic device 100 detects infrared reflected light from a nearby object by using the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness.

The fingerprint sensor 180H is configured to collect a fingerprint.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 lowers performance of a processor nearby the temperature sensor 180J, to reduce power consumption for thermal protection.

The touch sensor 180K is also referred to as a touch panel. The touch sensor 180K may be disposed on the display 194, and the touch sensor 180K and the display 194 constitute a touchscreen, which is also referred to as a "touch screen".

The bone conduction sensor 180M may obtain a vibration signal.

The button 190 includes a power button, a volume button, and the like. The button 190 may be a mechanical button or a touch button. The electronic device 100 may receive a button input, and generate a button signal input related to a user setting and function control of the electronic device 100.

The motor 191 may generate a vibration prompt.

The indicator 192 may be an indicator light, and may be configured to indicate a charging status and a power change, or may be configured to indicate a message, a missed call, a notification, and the like.

The SIM card interface 195 is configured to connect to a SIM card.

A software system of the electronic device 100 may use a layered architecture, an event-driven architecture, a microkernel architecture, a micro service architecture, or a cloud architecture. In embodiments of this application, an Android system with a layered architecture is used as an example to describe a software structure of the electronic device 100.

Figure 2:
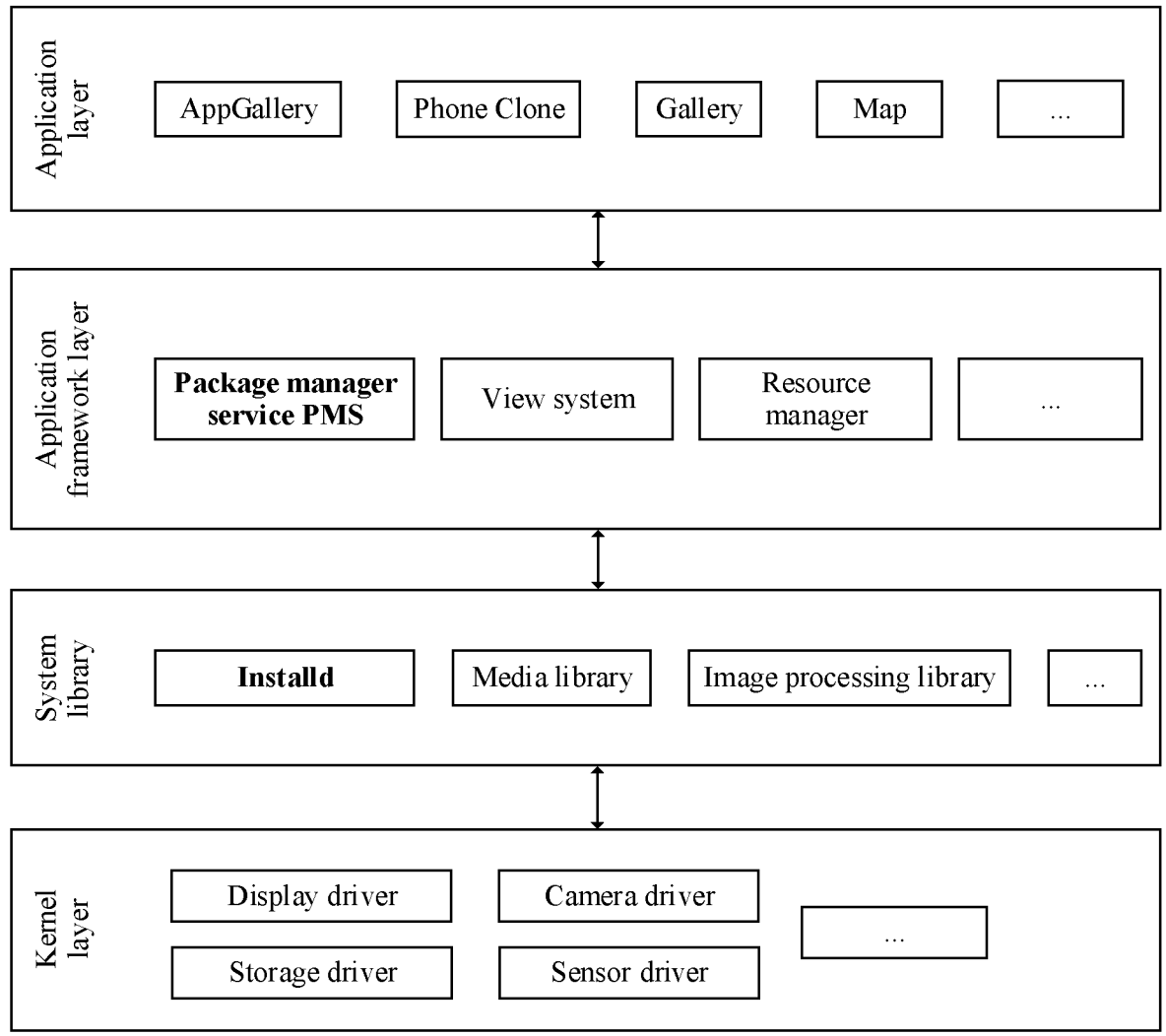
FIG. 2 is a block diagram of a software structure of an electronic device 100 according to an embodiment of this application.

FIG. 2 is a block diagram of the software structure of the electronic device 100 according to an embodiment of this application. In a layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom. The application layer may include a series of application packages.

As shown in FIG. 2, the application packages may include applications such as Camera, Gallery, Calendar, Phone, Map, Navigation, WLAN, Bluetooth, Music, Videos, and Messaging.

The application framework layer provides an application programming interface (application programming interface, API) and a programming framework for an application at the application layer. The application framework layer includes some predefined functions.

As shown in FIG. 2, the application framework layer may include a package manager service (package manager service, PMS), a window manager, a content provider, a view system, a resource manager, a notification manager, and the like.

The PMS is used to manage installation and uninstallation of software.

The window manager is used to manage a window program. The window manager may obtain a size of the display, determine whether there is a status bar, perform screen locking, take a screenshot, and the like.

The content provider is used to store and obtain data, and enable the data to be accessible by an application. The data may include a video, an image, audio, calls that are made and received, a browsing history, a bookmark, a phone book, and the like.

The view system includes a visual control, for example, a text display control or an image display control. The view system may be used to construct an application. A display interface may include one or more views. For example, a display interface including an SMS message notification icon may include a text display view and an image display view.

The resource manager provides various resources such as a localized character string, an icon, an image, a layout file, and a video file for an application.

The notification manager enables an application to display notification information in a status bar, and may be used to convey a notification message. The notification manager may automatically disappear after a short pause without user interaction. For example, the notification manager is used to notify download completion, give a message reminder, and the like. The notification manager may be alternatively a notification that appears in a top status bar of the system in a form of a graph or a scroll bar text, for example, a notification of an application running in the background, or may be a notification that appears on the screen in a form of a dialog window. For example, text information is displayed in the status bar, an announcement is given, the electronic device vibrates, or the indicator light blinks.

The Android runtime includes a kernel library and a virtual machine. The Android runtime is responsible for scheduling and management of the Android system.

The kernel library includes two parts: a function that needs to be invoked in a Java language and a kernel library of Android.

The application layer and the application framework layer run on the virtual machine. The virtual machine executes Java files at the application layer and the application framework layer as binary files. The virtual machine is used to perform functions such as object lifecycle management, stack management, thread management, security and exception management, and garbage collection.

The system library may include a plurality of function modules, for example, installd, a media library (media Library), a three-dimensional graphics processing library (for example, an OpenGL ES), and a 2D graphics engine (for example, an SGL).

The kernel layer is a layer between hardware and software. The kernel layer includes at least a display driver, a camera driver, a storage driver, a sensor driver, and the like.

For ease of understanding, in the following embodiments of this application, an electronic device having the structures shown in FIG. 1 and FIG. 2 is used as an example to describe in detail, with reference to the accompanying drawings and an application scenario, the application installation method provided in embodiments of this application.

Before the application installation method in embodiments of this application is described, terms in embodiments of this application are first briefly described.

1. An Android application package (Android application package, APK) is an application package file format used by an Android operating system, and is used to distribute and install a mobile application and middleware. To run code of an Android application on an Android device, the code needs to be compiled first and then packaged into a file that can be identified by the Android system. A format of the file that can be identified and run by the Android system is the "APK". The APK is obtained by combining xml, a resource file, and a dex (binary bytecode) file.

2. Blocking invocation means that a current thread is suspended before an invocation result is returned.

3. A dexopt thread is used to execute a dexopt task. Dexopt is a process of verifying and optimizing a dex file to generate an executable odex file. This process can improve application start and component loading performance.

4. A dex2oat thread is used to execute a dex2oat work task. Dex2oat is a process of optimizing an APK file to generate an oat file. The oat file is a private elf file format of Android, and includes not only a local machine instruction obtained by translating a dex file but also content in an original dex file. For an APK, the oat file is actually a package of an odex file, that is, oat=odex.

5. A dex2oat work task queue management thread is used to manage a dex2oat work task queue and fetch a dex2oat work task from the dex2oat work task queue.

FIG. 3(a) to FIG. 3(d) are a schematic diagram of a group of graphical user interfaces (graphical user interfaces, GUIs) according to an embodiment of this application. In this embodiment of this application, an example in which a user installs a plurality of applications by using a mobile phone is used. FIG. 3(a) to FIG. 3(d) show a process in which the user installs the plurality of applications at a time.

Figure 3A:
FIG. 3(a) to FIG. 3(d) are a schematic diagram of a group of GUIs according to an embodiment of this application.
Figure 3B:
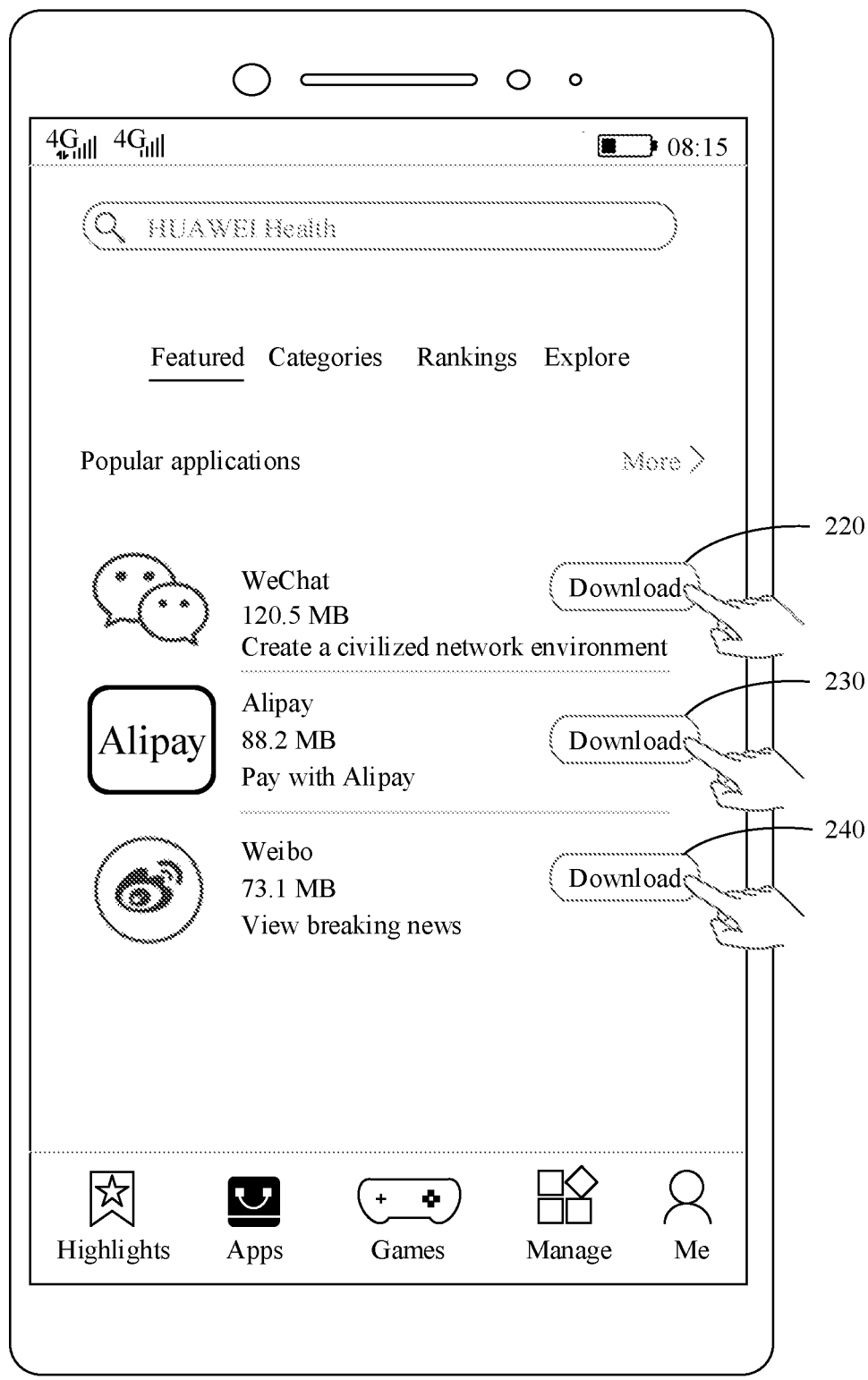
Figure 3C:
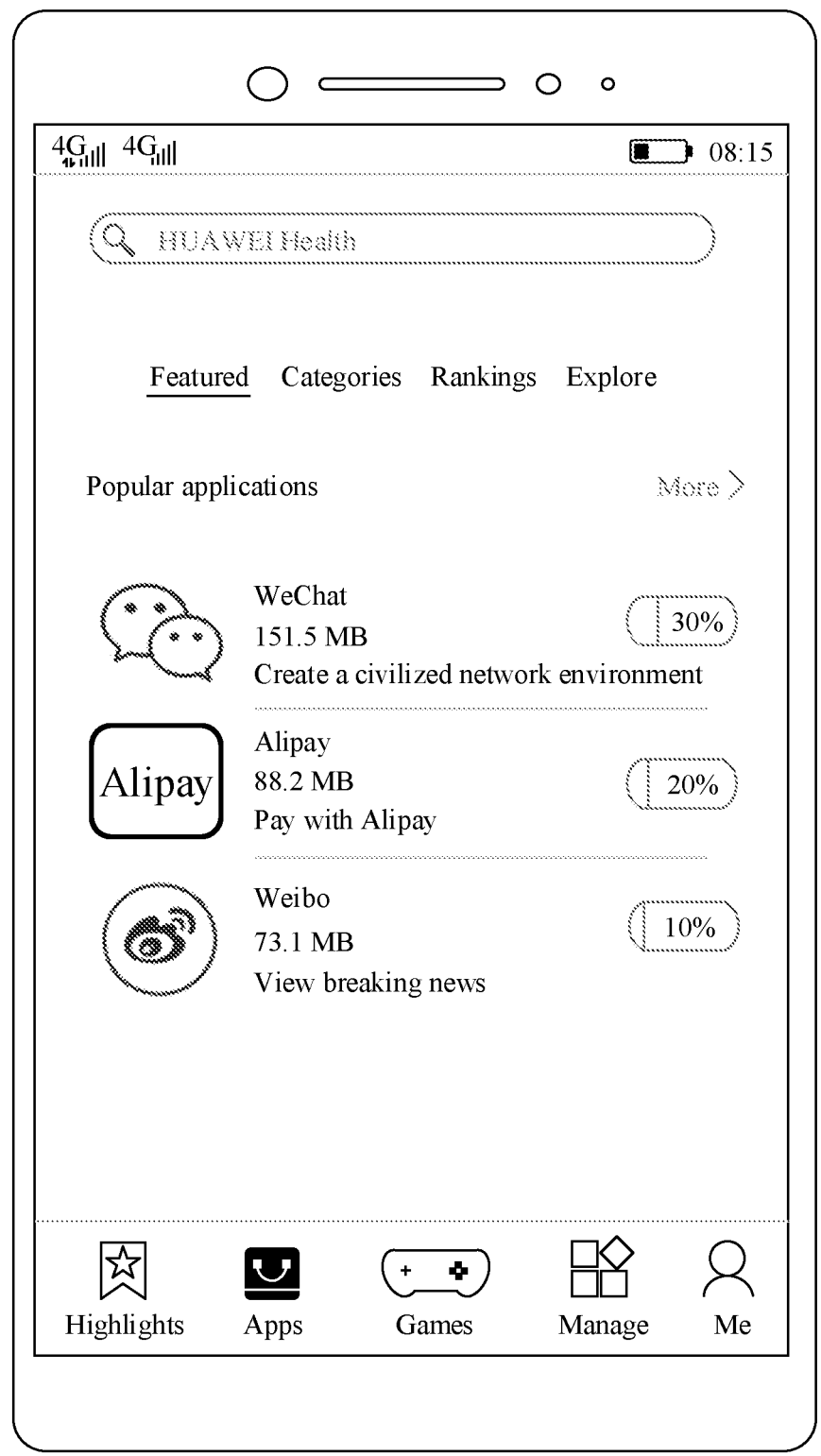
Figure 3D:

Refer to FIG. 3(a). A GUI is a home screen 200 of the mobile phone. After detecting an operation of tapping an icon 210 of AppGallery on the home screen 200 by the user, the mobile phone may display a GUI shown in FIG. 3(*b*).

Refer to FIG. 3(*b*). An interface of AppGallery is displayed on the GUI, and the user may download various required applications from AppGallery. For example, the user downloads the plurality of applications at a time. When detecting that the user sequentially taps download controls 220, 230, and 240, the mobile phone starts to download applications, and may display a GUI shown in FIG. 3(*c*).

Refer to FIG. 3(*c*). The mobile phone may display, on the interface, progress of a plurality of applications that are currently downloaded.

Refer to FIG. 3(*d*). When the plurality of applications are downloaded and installed, icons of the plurality of applications may be displayed on the home screen 220 of the mobile phone.

Figure 4:
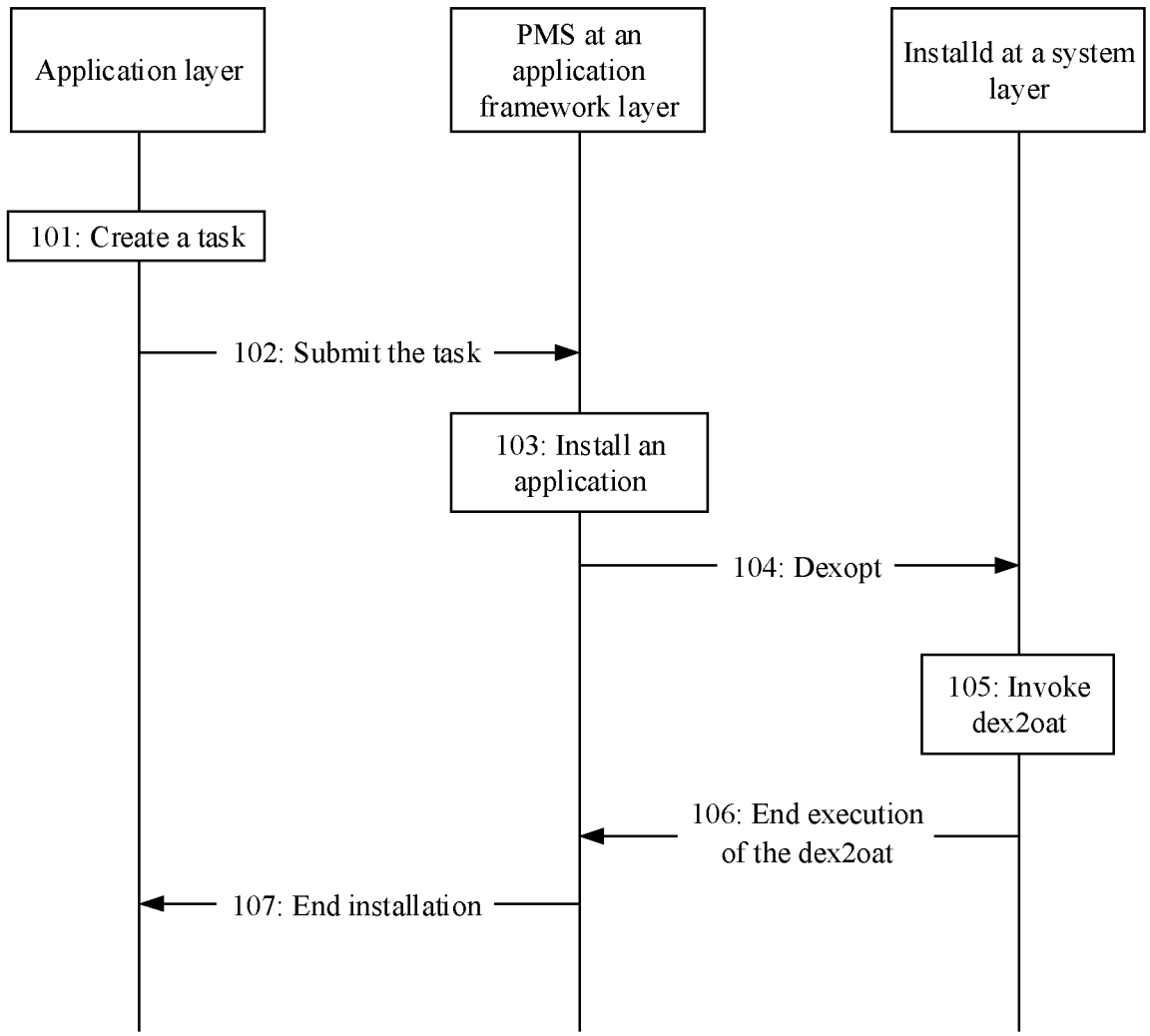
FIG. 4 is a schematic flowchart of installing an application according to an embodiment of this application.

FIG. 4 is a schematic flowchart of installing an application according to an embodiment of this application. An electronic apparatus based on an Android (Android) system is used as an example. The application is installed on the electronic apparatus through a package installer (package installer) interface. As shown in FIG. 4, the step includes Step 101 to Step 107.

Step 101: An application layer creates a task.

An application installation party creates the task in a manner of a package installer session (package installer session, PIS).

Step 102: Submit the task to a PMS at the application framework layer, so that the PMS installs the application.

Step 103: The PMS installs the application.

When installing the application, the PMS copies an APK file of the application from a download directory of the application to a system directory, scans the APK file, and parses the APK file by using a scanning process, to obtain information such as a component and a configuration file of the application.

Step 104: The PMS invokes an installd interface at a system layer to execute dexopt, so as to optimize the APK file.

In this process, the PMS performs blocking invocation on the installd interface.

Step 105: Installd invokes a dex2oat thread.

When executing the dexopt, the installd internally invokes the dex2oat thread to perform binary optimization on the APK file, so as to improve an application startup speed and component loading performance.

Step 106: The installd sends, to the PMS, a message indicating that execution of the dex2oat thread ends.

Step 107: The PMS determines that execution of the dexopt is completed, and sends, to the application installation party, a message indicating that installation of the app is completed.

In the foregoing application installation process, for installation of a single application, an installation process needs to be blocked to wait for a dex2oat optimization process. However, the dex2oat optimization process generally takes a long time. For example, if a typical application WeChat (whose size is approximately 120 MB) is installed on an electronic device, installation of a debugging version takes 14 s in total, and the dex2oat optimization process takes approximately 7 s, accounting for approximately half of total application installation duration.

Figure 5:
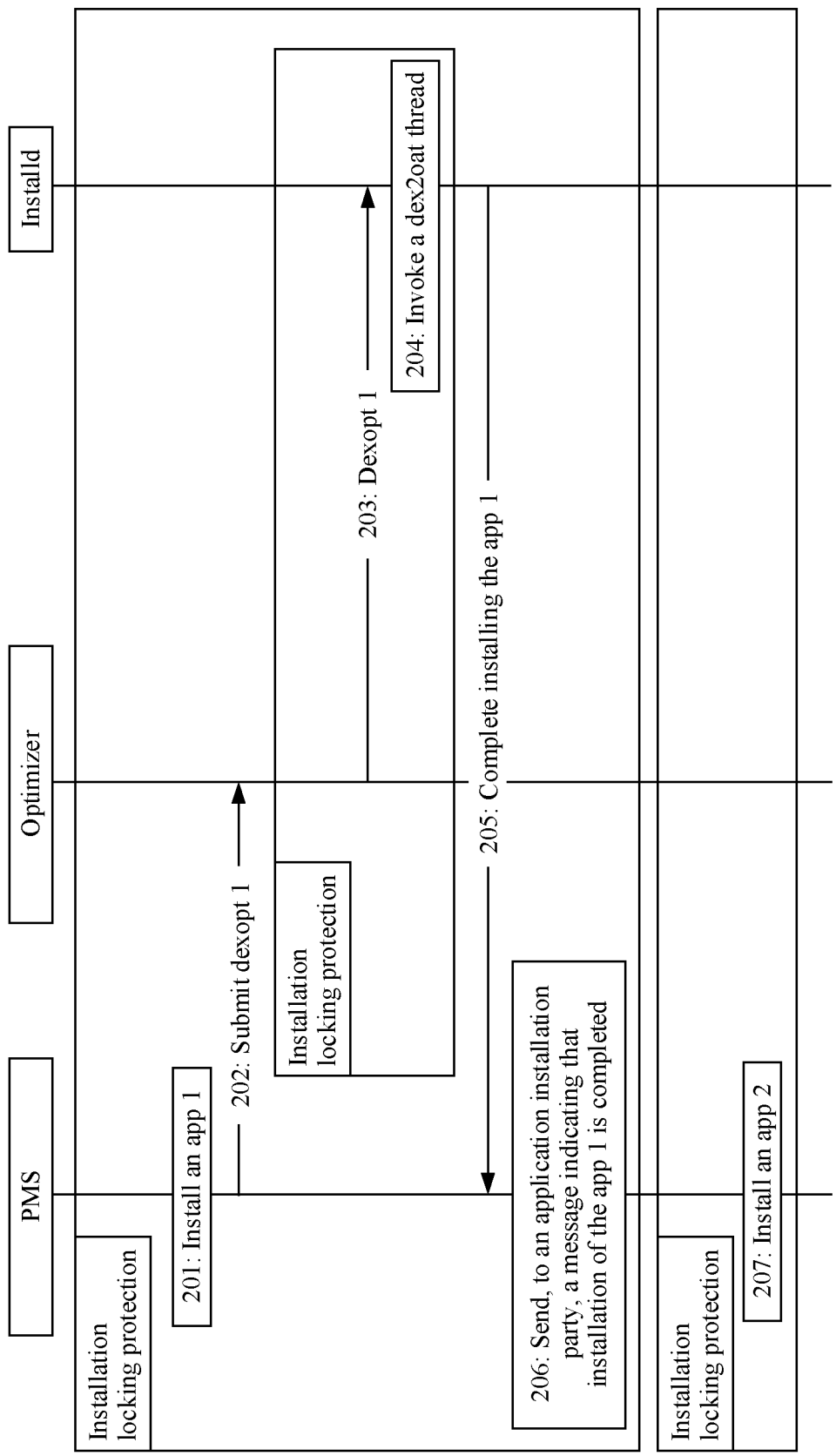
FIG. 5 is a schematic sequential flowchart of internally installing an application by a PMS according to an embodiment of this application.

FIG. 5 is a schematic sequential flowchart of internally installing an application by a PMS according to an embodiment of this application. As shown in FIG. 5, the procedure may include Step 201 to Step 206.

201: The PMS starts to install an app 1.

When starting to install the app 1, the PMS holds a mInstallLock lock. The mInstallLock lock is an installation locking protection file. When installation of a current application is not completed, the installation locking protection file prevents installation of another application.

202: The PMS submits a dexopt 1 task.

The PMS submits the dexopt 1 task to a package dex optimizer to optimize an APK file of the app 1.

203: The package dex optimizer sends the dexopt 1 task to installd.

In the process, a mInstallLock lock is held again. When a current dexopt task is not completed, the installation lock protection file prevents another dexopt task from being performed.

204: The installd internally invokes a dex2oat thread to execute a dex2oat work task, so as to perform binary optimization on the APK file.

205: After execution of the dex2oat work task is completed, the installd sends, to the PMS, a message indicating that installation of the app 1 is completed.

206: After receiving the message indicating that installation of the app 1 is completed, the PMS sends the message to an application installation party.

207: The PMS starts to install an app 2.

It should be understood that, after execution of the dex2oat work task ends, the mInstallLock locks are sequentially returned and released. In this period, the to-be-installed application is blocked for waiting, and an installation request of the another application cannot be executed.

Therefore, in a process of installing batch applications, due to existence of mInstallLock locks, installation and dex2oat work tasks of a plurality of applications are sequentially performed in a serial manner. As a result, installation processes of the plurality of applications are slow, and user experience is poor. Therefore, a quick application installation method is required, to improve user experience.

It should be understood that, in this embodiment of this application, a process in which the PMS copies and scans the APK file may be referred to as an "upper layer" or "upper-layer installation", and a dexopt or dex2oat optimization process may be referred to as a "bottom layer" or "bottom-layer optimization".

As described above, when apps are installed in batches on an electric device, upper-layer installation processes and bottom-layer optimization processes of a plurality of apps are sequentially performed in a serial manner. As a result, installation processes of the plurality of apps are slow, and user experience is poor.

This application provides an application installation method. When apps are installed in batches on an electronic device, execution processes of dex2oat work tasks, namely, bottom-layer optimization processes of the apps, are split from an entire installation process, so that upper-layer installation of the apps and bottom-layer optimization of the apps are performed in parallel. This increases an installation speed of installing a plurality of apps, and improves user experience.

Figure 6:
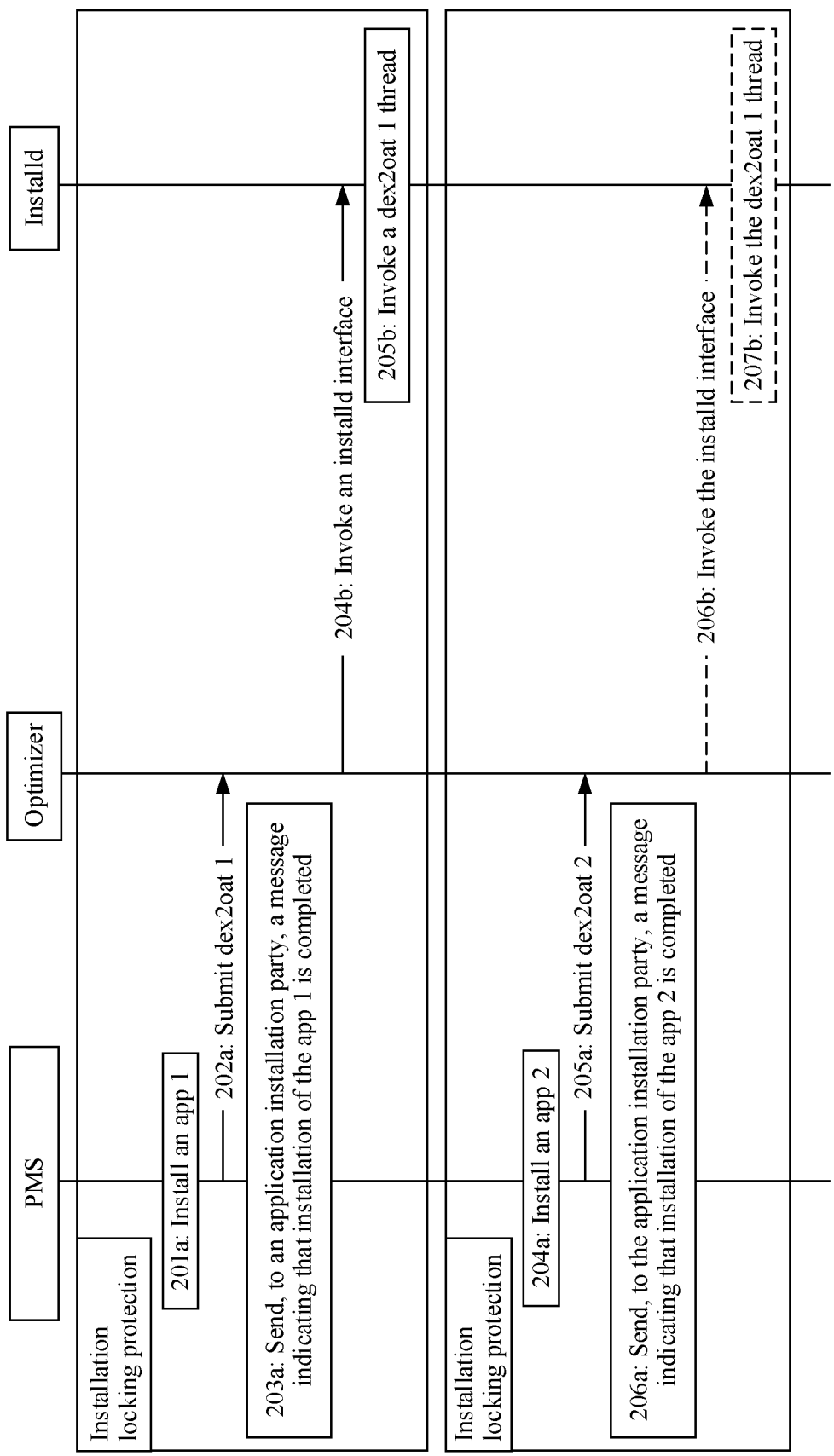
FIG. 6 is another schematic sequential flowchart of internally installing an application by a PMS according to an embodiment of this application.

FIG. 6 is another schematic sequential flowchart of internally installing an application by a PMS according to an embodiment of this application. As shown in FIG. 6, the procedure may include Step 201*a* to Step 206*a*.

201*a*: The PMS starts to install an app 1.

202*a*: The PMS submits a dex2oat work task of the app 1 to an optimizer.

Specifically, the PMS submits the dex2oat work task to a dex2oat work task queue, and a dex2oat work task queue management thread manages the queue.

203a: The PMS sends, to an application installation party, a message indicating that installation of the app 1 is completed.

It should be understood that Step 202a and Step 203a may be performed at the same time.

204a: The PMS starts to install an app 2.

204b: The optimizer invokes an installd interface.

Specifically, the dex2oat work task queue management thread is used to fetch the dex2oat work task from the queue.

205b: After the dex2oat work task corresponding to the app 1 is fetched, the installd interface internally invokes a dex2oat thread to execute the dex2oat work task.

It should be understood that Step 204b and Step 205b are performed in parallel with Step 204a, and performing of Step 204b and Step 205b does not affect performing of Step 204a.

205a: The PMS submits a dex2oat work task of the app 2 to the optimizer.

206a: The PMS sends, to the application installation party, a message indicating that installation of the app 2 is completed.

206b: After Step 205b is performed, the dex2oat work task management thread fetches the dex2oat work task corresponding to the app 2 from the queue, and invokes the installd interface.

207b: The installd interface internally invokes the dex2oat thread to execute the dex2oat work task corresponding to the app 2.

Similarly, Step 207b and Step 208b do not affect installation of a next application.

In this embodiment of this application, a PMS upper-layer installation process and a bottom-layer optimization process of the application are performed in parallel. Compared with an existing serial installation process, this technical solution can improve an installation speed of installing the applications in batches, and improve user experience.

Figure 7:
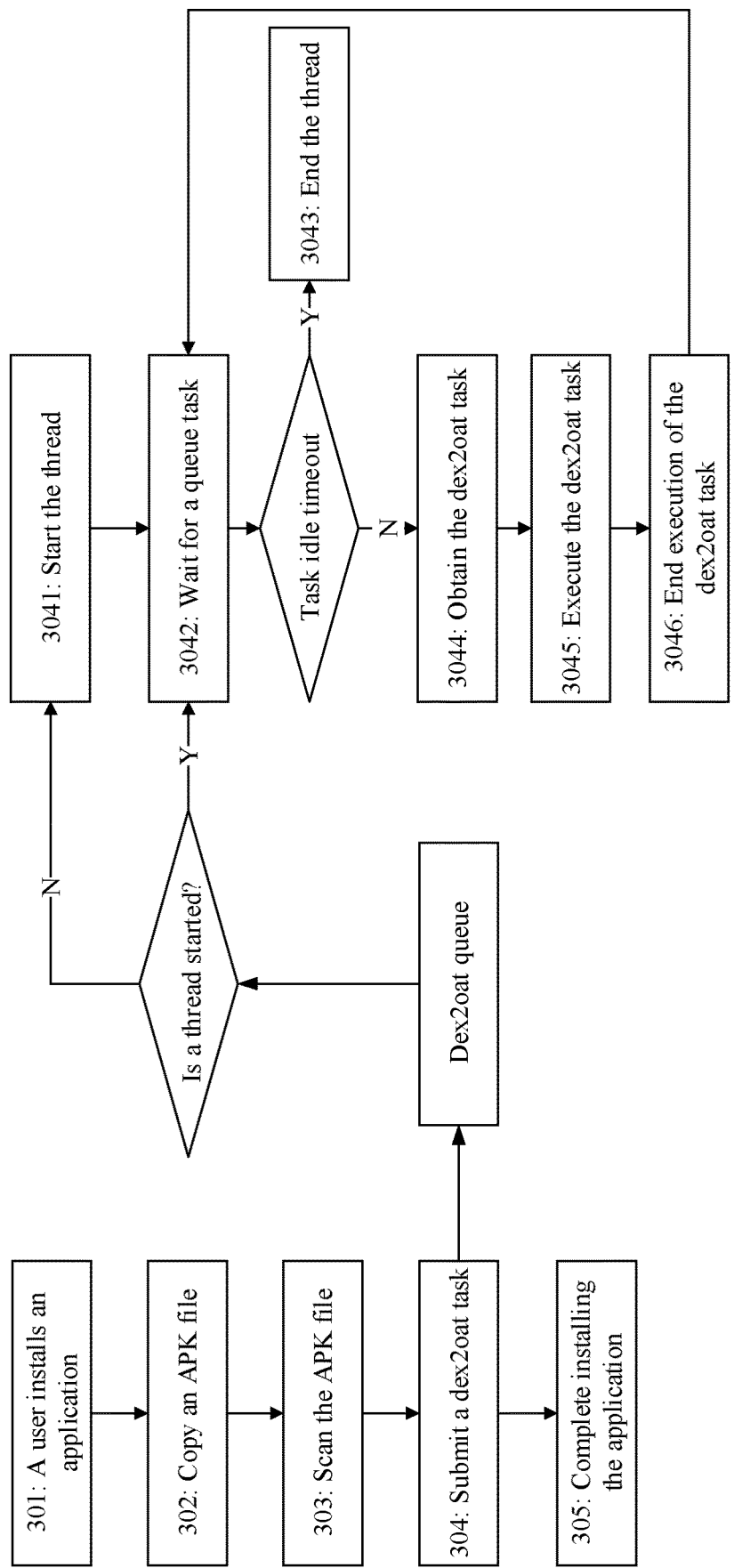
FIG. 7 is a flowchart of an application installation method according to an embodiment of this application.

FIG. 7 is a flowchart of an application installation method according to an embodiment of this application. As shown in FIG. 7, the method may include Step 301 to Step 305.

301: A user installs an application.

For example, the user downloads a plurality of applications from AppGallery and installs the plurality of applications, or uses a cloned backup to restore a plurality of applications.

302: Copy an APK file.

An application installation party copies the APK file for subsequent installation.

303: Scan the APK file.

A PMS scans the APK file to parse the APK file, so as to obtain information such as a component and a configuration file of the application.

304: Submit a dex2oat work task.

The PMS invokes an installd interface to perform dexopt optimization, and installd internally invokes a dex2oat thread to perform a dex2oat optimization process, so as to optimize the APK file.

It should be understood that, in a process of installing applications in batches on an electronic device, each application corresponds to one dex2oat work task. The electronic device may put, into a queue, dex2oat work tasks corresponding to the applications in an application installation sequence. For example, an app 1, an app 2, and an app 3 are sequentially installed on the electronic device, and dex2oat work tasks corresponding to the app 1, the app 2, and the app 3 are respectively dex2oat 1, dex2oat 2, and dex2oat 3. In this case, a dex2oat work task queue includes the dex2oat 1, the dex2oat 2, and the dex2oat 3. In an application installation process, a background dex2oat work task queue management thread is used to sequentially fetch the dex2oat work tasks from the task queue. The installd internally invokes the dex2oat thread to perform the dex2oat optimization process, so that the dex2oat optimization process does not hinder performing of the installation process. In this process, a process of executing the dex2oat work tasks is split from the entire application installation process, and the application installation process and a dex2oat execution process are processed in parallel. This can quicken installation of batch applications.

Specifically, Step 304 may include Step 3041 to Step 3046.

3041: Start the background dex2oat work task queue management thread.

The dex2oat work task queue management thread is used to manage the dex2oat work task queue and sequentially fetch the dex2oat work tasks from the dex2oat work task queue.

3042: Wait for the dex2oat work task queue.

For example, the app 1, the app 2, and the app 3 are sequentially installed on the electronic device. In this case, the dex2oat work tasks are the dex2oat 1, the dex2oat 2, and the dex2oat 3.

3043: If the dex2oat work task has idle timeout, end the dex2oat work task queue management thread.

The idle timeout may be understood as that, when duration in which no task is executed in the dex2oat work task queue is greater than a preset value, it may be considered that execution of all the dex2oat work tasks in the dex2oat work task queue ends. In this case, a system stops the work task queue management thread, to help reduce power consumption of the electronic device.

3044: If the dex2oat is not idle, obtain the dex2oat work task.

3045: Execute the dex2oat work task.

The installd invokes the dex2oat thread to execute the dex2oat work task, so as to perform binary optimization on an APK file of the application.

3046: End execution of the dex2oat work task.

After the dex2oat thread compiles a dex file into an oat file format, execution of the dex2oat work task of the application ends.

It should be understood that the foregoing process is a process of executing a dex2oat work task of an application. After execution of the dex2oat work task of the application is completed, a process of executing a dex2oat work task of a next application is the same as that in Steps 3042 to 3046. Details are not described again.

It should be further understood that the application installation sequence may be a sequence in which the electronic device completes downloading the applications, or may be a sequence based on preset priorities. This is not specifically limited in this embodiment of this application.

305: Complete installing the application.

It should be understood that, in Step 305, once the dex2oat work task corresponding to the application is submitted in Step 304, it may be considered that installation of the application is completed. To be specific, installation of the next application may be performed, and the dex2oat work task corresponding to the application is executed in the background. In this case, the PMS sends, to the application installation party, a broadcast message indicating that installation of the application is completed.

For example, an application that is currently being installed is the app 1. After the dex2oat 1 corresponding to the app 1 is submitted in Step 304, it may be considered that installation of the app 1 is completed, and installation of the app 2 may be performed. When the app 2 is installed, the dex2oat 1 is executed in the background.

Based on the foregoing technical solution, when the applications are installed in batches on the electronic device, the dex2oat work tasks corresponding to the applications may be split from the installation process, so that an upper-layer application installation process and a bottom-layer dex2oat optimization process are processed in parallel. This can increase an installation speed of batch applications, and improve user experience.

Figure 8:
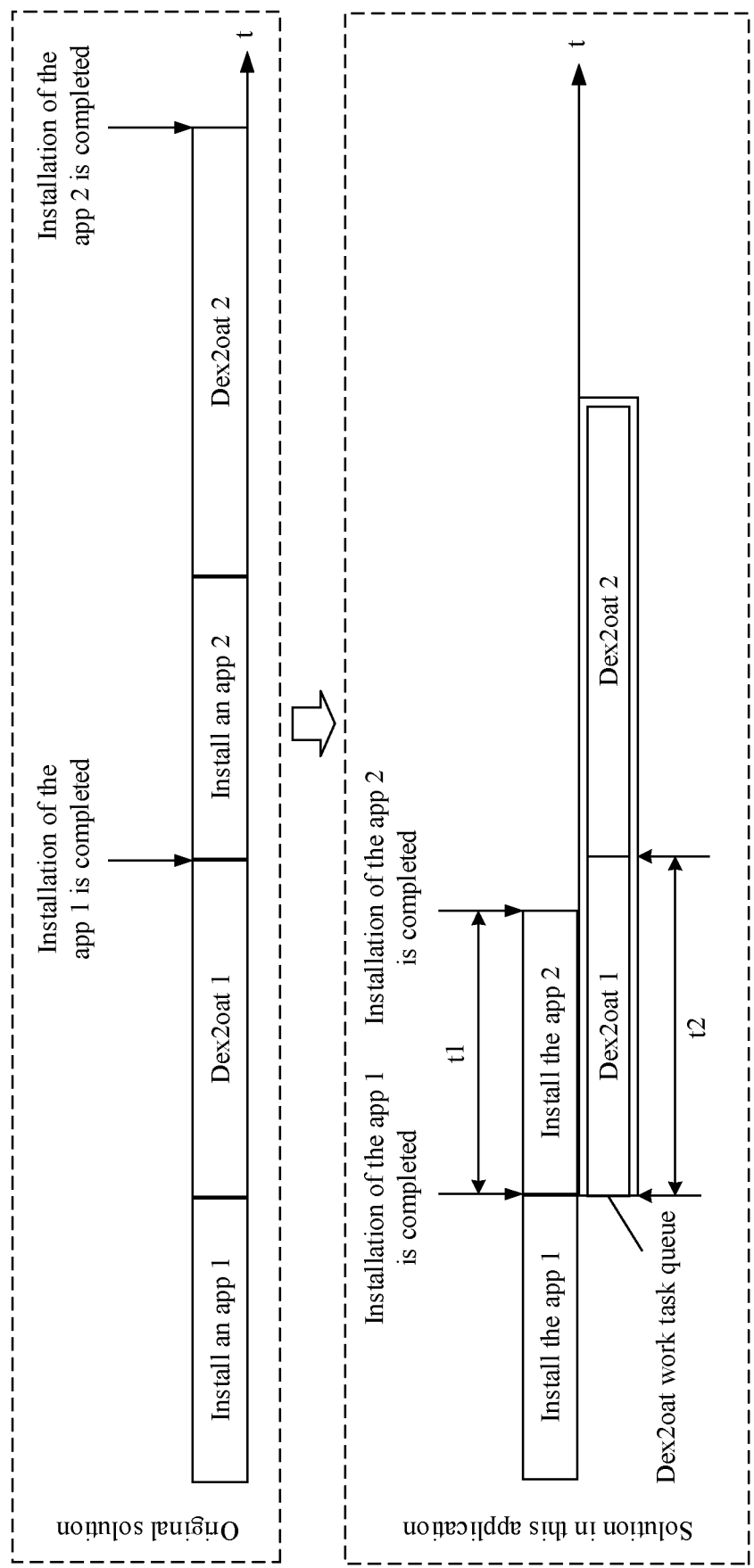
FIG. 8 is a schematic sequence diagram of installing an application according to an embodiment of this application.

FIG. 8 is a schematic sequence diagram of installing an application according to an embodiment of this application. As shown in FIG. 8, in an original technical solution, when applications are installed in batches on an electronic device, a plurality of applications are sequentially installed in a serial manner. For example, before an app 2 is installed, a dex2oat work task of an app 1 needs to be executed. Similarly, before an app 3 is installed, a dex2oat work task of the app 2 needs to be executed. As a result, installation of batch applications is slow, and user experience is affected.

In this embodiment of this application, as shown in FIG. 8, in response to an operation of triggering installation of an application by a user, an APK 1 (namely, an upper-layer to-be-installed app 1) corresponding to a first application is copied and scanned, an APK 2 (namely, an upper-layer to-be-installed app 2) corresponding to a second application is copied and scanned in a first time period t1 after the APK 1 is copied and scanned, and optimization is performed on the first application in a second time period t2 after the APK 1 corresponding to the first application is copied and scanned. To be specific, dex2oat 1 is performed in the time period t2. The first time period t1 and the second time period t2 at least partially overlap.

As shown in FIG. 8, a start time point of the first time period t1 and a start time point of the second time period t2 are the same. In this case, the dex2oat 1 and upper-layer installation of the app 2 are performed in parallel. This can improve a speed of installing the application, and improve user experience.

In another example, a start time point of t1 and a start time point of t2 may be alternatively different. For example, the start time point of t2 is earlier than the start time point of t1, but the time periods t1 and t2 at least partially overlap. In this way, upper-layer installation of the app 2 and bottom-layer optimization of the app 1 may also be performed in parallel, to improve a speed of installing a plurality of applications.

In a possible implementation, a first optimization task, namely, a dex2oat task, corresponding to the app 1 may be added to a first task queue. A first thread fetches the first optimization task from the first task queue. A first interface is invoked, and the first interface starts a second thread, to execute the first optimization task.

For example, the first task queue is a dex2oat task queue, the first thread is a dex2oat task queue management thread, the first interface is an installd interface, and the second thread is a dex2oat thread.

Based on the application installation method provided in this embodiment of this application, compared with that in an original application installation method, duration that can be optimized when the app 1 and the app 2 are installed is a sum of a period of time consumed for performing the dex2oat 1 and a period of time consumed for performing a dex2oat 2.

Figure 9:
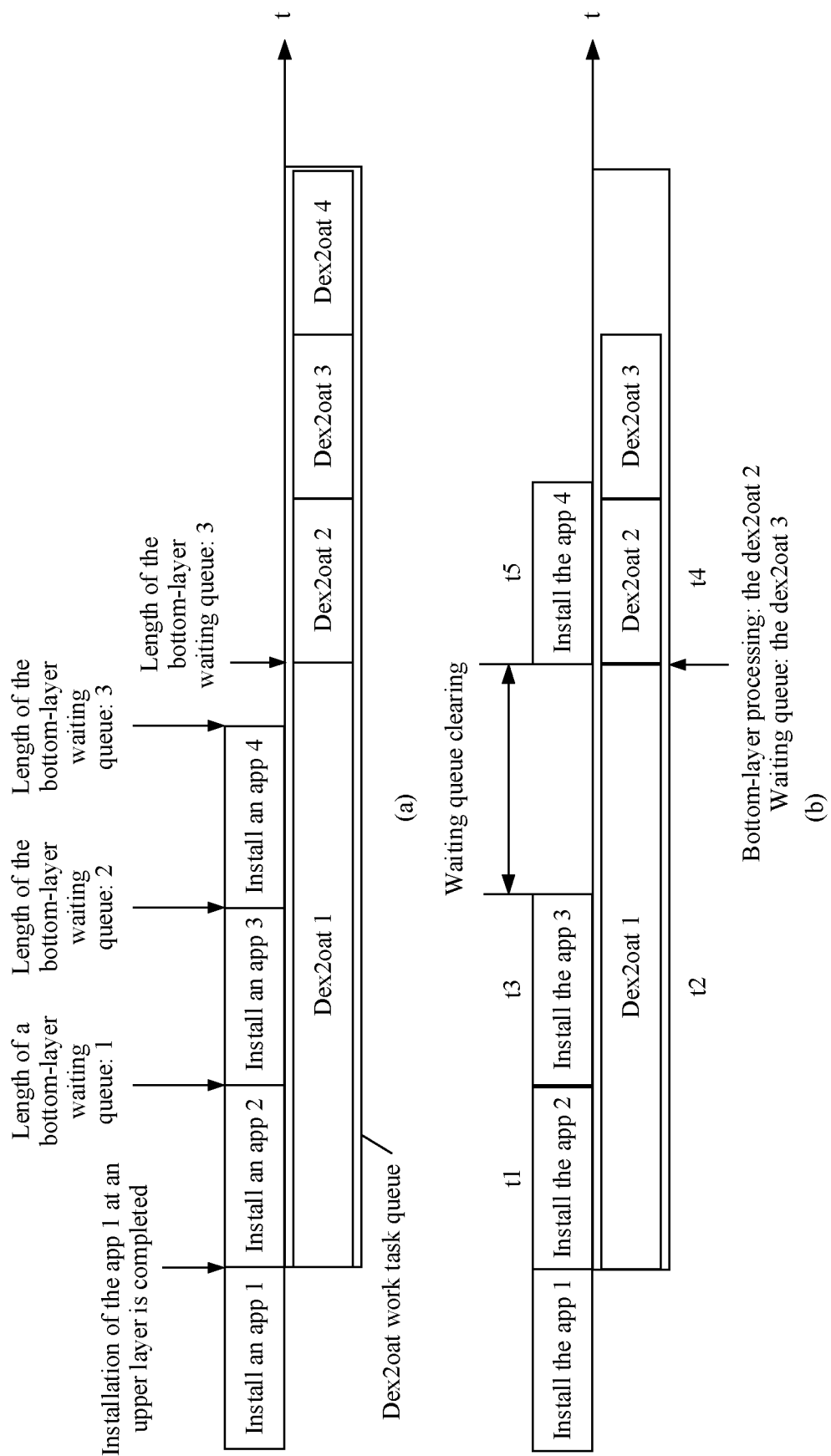
FIG. 9 is another schematic sequence diagram of installing an application according to an embodiment of this application.

FIG. 9 is a schematic sequence diagram of installing an application according to an embodiment of this application.

In this embodiment of this application, when applications are installed in batches, a case that may occur is as follows: An execution process of dex2oat 1 corresponding to an app 1 takes a long time. As shown in (a) in FIG. 9, installation of the app 1 at an upper layer is completed, an app 2 starts to be installed, and the dex2oat 1 starts, at a bottom layer, to be executed for the app 1. Installation of the app 2 at the upper layer is completed, and dex2oat 2 is added to a dex2oat work task queue. Because execution of the dex2oat 1 is not completed at this time, dex2oat 2 can only wait for execution in the queue. At this time, an app 3 starts, at an upper layer, to be installed. After installation of the app 3 at the upper layer is completed, dex2oat 3 is added to the dex2oat work task queue for execution. An app 4 starts, at the upper layer, to be installed. After installation of the app 4 at the upper layer is completed, dex2oat 4 is added to the dex2oat work task queue for execution. At this time, execution of the dex2oat 1 is still not completed. As a result, a result is that a large quantity of tasks are stacked in the dex2oat work task queue, but these tasks are not actually executed. If an electronic device is abnormal (for example, powered off or restarted) at this time, dex2oat corresponding to some apps may not be performed. When a user starts the application, the application is started in a normal mode.

It should be understood that dex2oat optimization is performed on the app to improve a startup speed and component loading performance of the app. In the normal mode, the app is not optimized, and a case in which the startup speed of the app is lower may occur.

For the foregoing case that may occur, the embodiment of this application provides a method, to control a quantity of tasks that are stacked in the dex2oat work task queue. As shown in (b) in FIG. 9, the method may include the following steps.

(1) Complete installing the app 1 at the upper layer, install the app 2 at the upper layer in a first time period t1 after installation of the app 1 at the upper layer is completed, and optimize the app 1 in a second time period t2 after installation of the app 1 at the upper layer is completed.

For example, a start time point of the first time period t1 and a start time point of the second time period t2 are the same. To be specific, the dex2oat 1 starts to be executed for the app 1 at the bottom layer when the app 2 is installed at the upper layer.

(2) Install the app 3 at the upper layer in a third time period t3 after installation of the app 1 at the upper layer is completed.

For example, the upper-layer installation of the app 2 is completed, and execution of the dex2oat 1 is not completed. In this case, the dex2oat 2 corresponding to the app 2 is added to a waiting queue, and the app 3 starts to be installed at the upper layer.

(3) Optimize the app 2 in a fourth time period t4 after installation of the app 1 at the upper layer is completed.

For example, the dex2oat 2 corresponding to the app 2 is added to the waiting queue, and is executed in the fourth time period t4.

Specifically, a dex2oat work task queue management thread (namely, a first thread) fetches the dex2oat 2 from the queue, a PMS invokes an installd interface for execution, and installd internally starts a dex2oat thread (namely, a third thread) to execute the dex2oat 2.

(4) Install the app 4 at the upper layer in a fifth time period t5 after installation of the app 1 at the upper layer is completed. When duration of the second time period t2 is greater than a sum of duration of the first time period t1 and duration of the third time period t3, a start moment (namely, a start moment of t5) at which a fourth application package is scanned and copied is later than or equal to a start moment (namely, a start moment of t4) for at which optimization is performed on a second application.

When the duration of the second time period t2 is greater than the sum of the duration of the first time period t1 and the duration of the third time period t3, it means that an optimization task of the app 1 at the bottom layer takes a long time. If no control is performed, a plurality of dex2oat work tasks may be stacked in the dex2oat work task queue at the bottom layer. In this case, the PMS does not send, to an application installation party, a broadcast indicating that installation of the app 3 is completed, but waits for completion of execution of the dex2oat 1 at the bottom layer. When execution of the dex2oat 1 at the bottom layer is completed, the dex2oat 2 starts to be executed. In this case, the dex2oat 3 corresponding to the app 3 is added to the dex2oat waiting queue, and the dex2oat 3 is waiting to be executed in the dex2oat work task queue. In this case, the PMS sends, to the application installation party, a message indicating that installation of the app 3 is completed, and the app 4 starts to continue to be installed at the upper layer. A start moment at which optimization is performed on the app 2 is equal to a start moment at which the app 4 is copied and scanned. In other words, installation of the app 4 at the upper layer and execution of the dex2oat 2 at the bottom are performed at the same time.

It should be understood that, for subsequent installation of more applications, refer to the foregoing installation process. Details are not described again.

It should be understood that the foregoing process is described by using an example in which one dex2oat work task is stacked in the dex2oat work task queue. However, this embodiment of this application is not limited thereto. In this embodiment of this application, there may be two, three, or more dex2oat work tasks that are stacked in the dex2oat work task queue.

Based on the foregoing technical solution, when the applications are installed in batches, when a dex2oat execution process of an application takes a long time, this solution can prevent excessive dex2oat work tasks from being stacked in the dex2oat work task queue.

Figure 10:
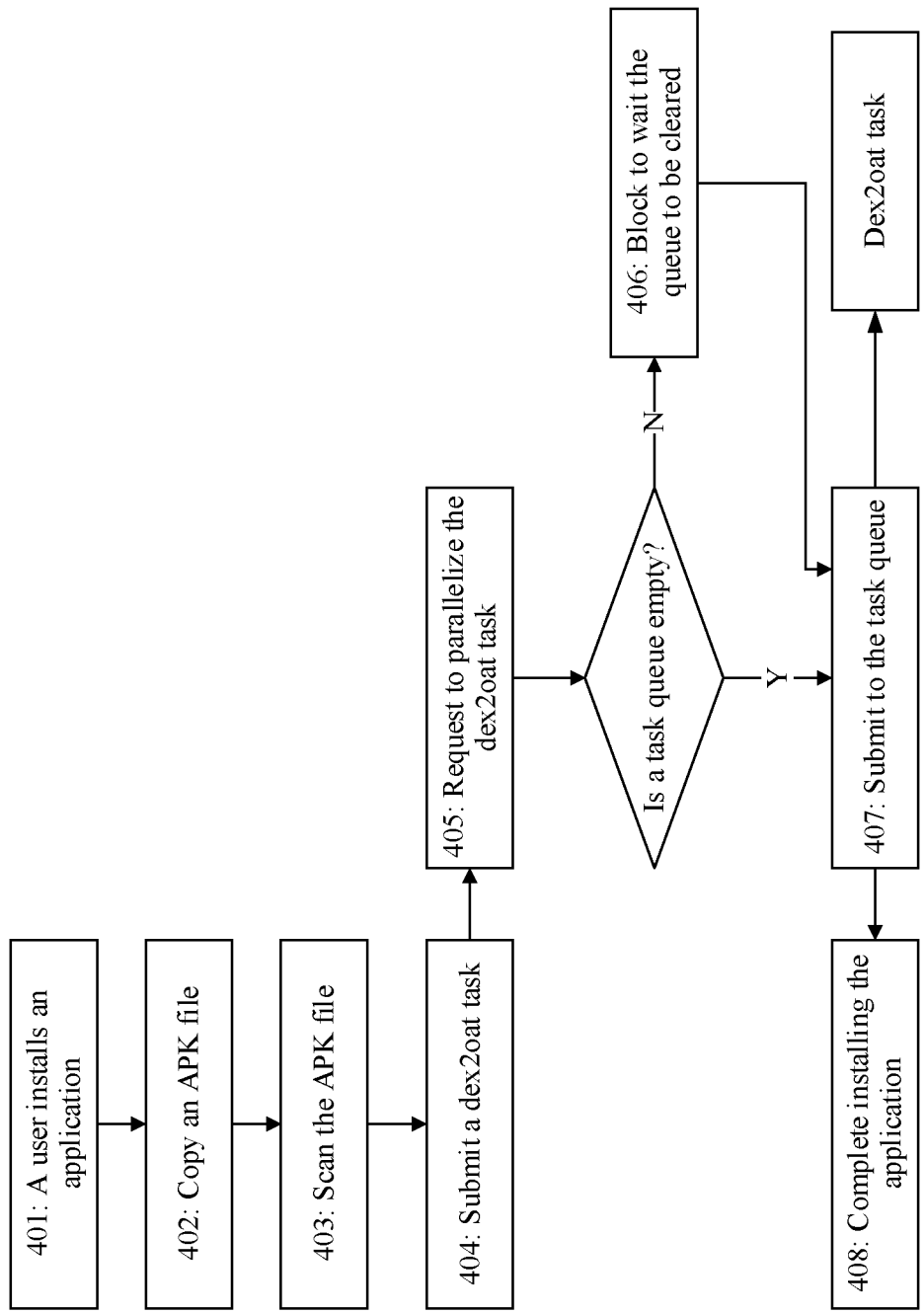
FIG. 10 is a schematic flowchart of an application installation method according to an embodiment of this application.

FIG. 10 is a schematic flowchart of an application installation method according to an embodiment of this application. The method may include Step 401 to Step 408.

401: A user installs an application.
402: Copy an APK file.
403: Scan the APK file.

It should be understood that, for Steps 401 to 403, refer to the foregoing descriptions. For brevity, details are not described again.

404: Submit a dex2oat work task.

A PMS invokes an installd interface to perform dexopt optimization, and installd internally invokes a dex2oat thread to perform a dex2oat optimization process.

405: Parallelize the dex2oat work task.

As described above, installation of the app at an upper layer and execution of the dex2oat work task at a bottom layer are processed in parallel by applying the application installation method in this embodiment of this application, to increase a speed of installing the application.

406: If a dex2oat work task waiting queue is not empty, block to clear the waiting queue.

It should be understood that the dex2oat work task waiting queue indicates a queue in which a dex2oat work task other than a dex2oat work task that is currently being executed waits to be executed.

In a process of installing the application, when installation of the app at the upper layer and the dex2oat work task at the bottom layer are processed in parallel, if a current dex2oat work task waiting queue is not empty, it means that execution of a current dex2oat work task is not completed. In this case, the PMS is blocked to wait for completion of execution of the dex2oat work task, and then notifies an application installation party that installation of the application is completed.

For example, refer to (b) in FIG. 9. An app 3 is installed at the upper layer. When the PMS submits a dex2oat 3, execution of a current dex2oat 1 is not completed, and a dex2oat 2 still exists in the dex2oat work task queue and waits for execution at this time. In this case, the PMS does not send, to an application installation party, a message indicating that installation of the app 3 is completed, but is blocked to wait for execution of the dex2oat 1 to be completed. After execution of the dex2oat 1 is completed, the dex2oat 2 starts to be executed. In this case, the waiting queue is empty.

407: If a dex2oat work task waiting queue is empty, submit the dex2oat work task.

If the dex2oat work task queue is empty, it means that a dex2oat work task waiting to be executed in the dex2oat work task queue is empty. In this case, the dex2oat work task of the application may be submitted to the dex2oat work task queue. In other words, the dex2oat work task corresponding to the application is added to the dex2oat work task waiting queue.

In an example, in Step 406, the dex2oat work task waiting queue is not empty. After the PMS is blocked to clear the waiting queue, the PMS submits the dex2oat work task of the application to the task queue. For example, refer to (b) in FIG. 9. After execution of a dex2oat 1 is completed, a dex2oat 2 starts to be executed, and the dex2oat waiting queue is empty at this time. In this case, the PMS sends, to an application installation party, a broadcast indicating that installation of an app 3 is completed, and dex2oat 3 corresponding to the app 3 is added to the dex2oat waiting queue for execution.

In another example, an app 3 is installed at the upper layer, dex2oat 2 is being executed at a bottom layer, and there is no dex2oat work task waiting to be executed in the dex2oat work queue at this time. In this case, dex2oat 3 is added to the dex2oat work task queue, waiting to be executed.

408: Complete installing the application.

After the dex2oat work task of the currently installed app is submitted to the dex2oat work task queue, the PMS sends, to the application installation party, a broadcast indicating that installation of the app is completed.

It should be understood that, in this case, although the PMS sends, to the application installation party, the broadcast indicating that installation of the app is completed, the dex2oat work task corresponding to the app is still executed or waits to be executed in the background.

Based on the foregoing technical solution, when applications are installed in batches, this solution can prevent excessive dex2oat work tasks from being stacked in the dex2oat work task queue.

In a process of installing batch applications, dex2oat work tasks of the applications are executed in a local system of an electronic device. Because a dex2oat execution process is a process with a high computing amount, there is high power consumption. Consequently, a temperature of the electronic device rises in a short time, and stability of the electronic device may be affected. Therefore, an embodiment of this application provides a temperature control policy method to resolve the foregoing problem.

Figure 11:
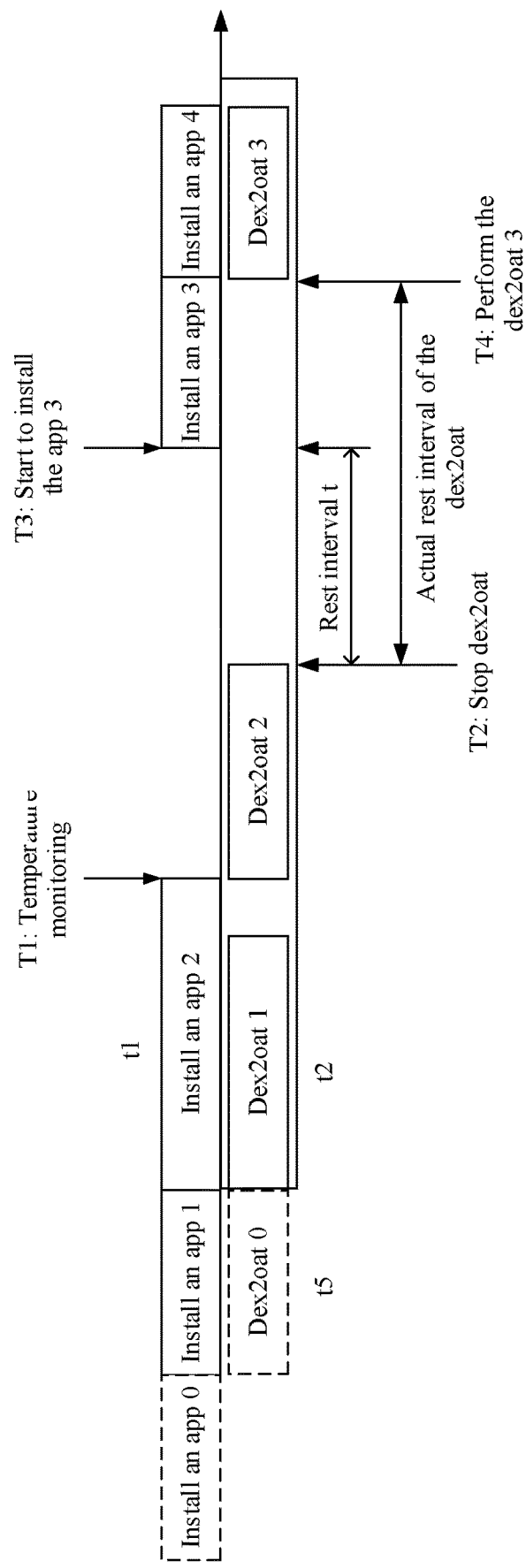
FIG. 11 is a schematic sequential flowchart of a temperature control policy method during application installation according to an embodiment of this application.

FIG. 11 is a schematic sequential flowchart of a temperature control policy method during application installation according to an embodiment of this application. As shown in FIG. 11, on an electronic device, installation of an app 1 at an upper layer is completed, dex2oat 1 starts, at a bottom layer, to be executed, and an app 2 starts, at the upper layer, to be installed. When dex2oat 2 is ready to be submitted, that is, at a moment T1, a temperature of the electronic device is monitored. The temperature may be an overall temperature of the electronic device, or may be a temperature of a central processing unit (center processing unit, CPU) of the electronic device.

For example, a threshold range of the temperature may be preset. When the temperature is greater than a first threshold, it is considered that the temperature of the electronic device is abnormal. When the temperature is less than or equal to the first threshold, it is considered that the temperature of the electronic device is normal. For example, the first threshold may be any value between 35° C. and 40° C.

If it is monitored at the moment T1 that the temperature of the electronic device is abnormal, first execution duration (namely, a fourth time period) is determined. The first execution duration is used to indicate duration in which the electronic device continuously executes a dex2oat work task, and the first execution duration may be used to determine whether the dex2oat work task has been executed for a long time. If the dex2oat work task has been executed for a long time, a PMS does not send, to an application installation party, a broadcast indicating that installation of the app 2 is completed, and triggers stopping of the dex2oat work task, namely, pauses a dex2oat work task queue management thread, so that the dex2oat work task queue management thread rests for first preset duration, that is, scheduling of the dex2oat work task is paused in the first preset duration. To be specific, after the first preset duration, an app 3 is copied and scanned. It should be noted that an execution process of a current dex2oat work task is not immediately stopped, but stopping of the dex2oat work task is triggered only after execution of the dex2oat 2 of the app 2 is completed. At a moment T2 shown in FIG. 11, because a scanning process and a dex2oat optimization process of an app are one installation process, the scanning process and the dex2oat optimization process of the app are not separated as much as possible, to avoid a problem of insufficient stability.

Optionally, when it is detected at the moment T1 that the temperature of the electronic device is abnormal, stopping of the dex2oat work task may be triggered, that is, the dex2oat work task queue management thread is paused for the first preset duration. Similarly, stopping of the dex2oat work task is triggered only after execution of the dex2oat 2 of the app 2 is completed.

It should be understood that temperature monitoring in this embodiment of this application may be implemented by using a temperature sensor, or may be implemented by using another sensor having a temperature monitoring function. This is not specifically limited in this embodiment of this application.

It should be understood that, in this embodiment of this application, whether a current dex2oat optimization process has been executed for a long time may be determined by counting execution duration of the current dex2oat optimization process. For example, if the execution duration of the current dex2oat optimization process is greater than a preset value, it may be considered that the current dex2oat optimization process has been executed for a long time. The following describes a process of determining whether the current dex2oat optimization process has been executed for a long time with reference to a specific embodiment. Details are not described herein.

At the moment T2, stopping of the dex2oat work task queue management thread is triggered, so that the dex2oat work task queue management thread rests for a period of time until a moment T3. A rest time interval may be preset duration, for example, 5 s, 10 s, or another value.

At the moment T3, the dex2oat work task has been paused for a period of time t. The PMS sends, to the application installation party, the broadcast indicating that installation of the app 2 ends, and the app 3 starts to be installed.

At a moment T4, installation of the app 3 at the upper layer ends, and dex2oat 3 starts, at the bottom layer, to be executed.

It can be seen that, from triggering stopping of the dex2oat work task at the moment T2 to starting, at the moment T4, to perform the dex2oat 3, actually, rest duration of the dex2oat work task is T2 to T4. This can effectively reduce a heating problem, that occurs in a short time, of the electronic device in a process of installing applications in batches.

It should be understood that, for subsequent installation of more applications, refer to the moments T1 to T4. For brevity, details are not described again.

Figure 12:
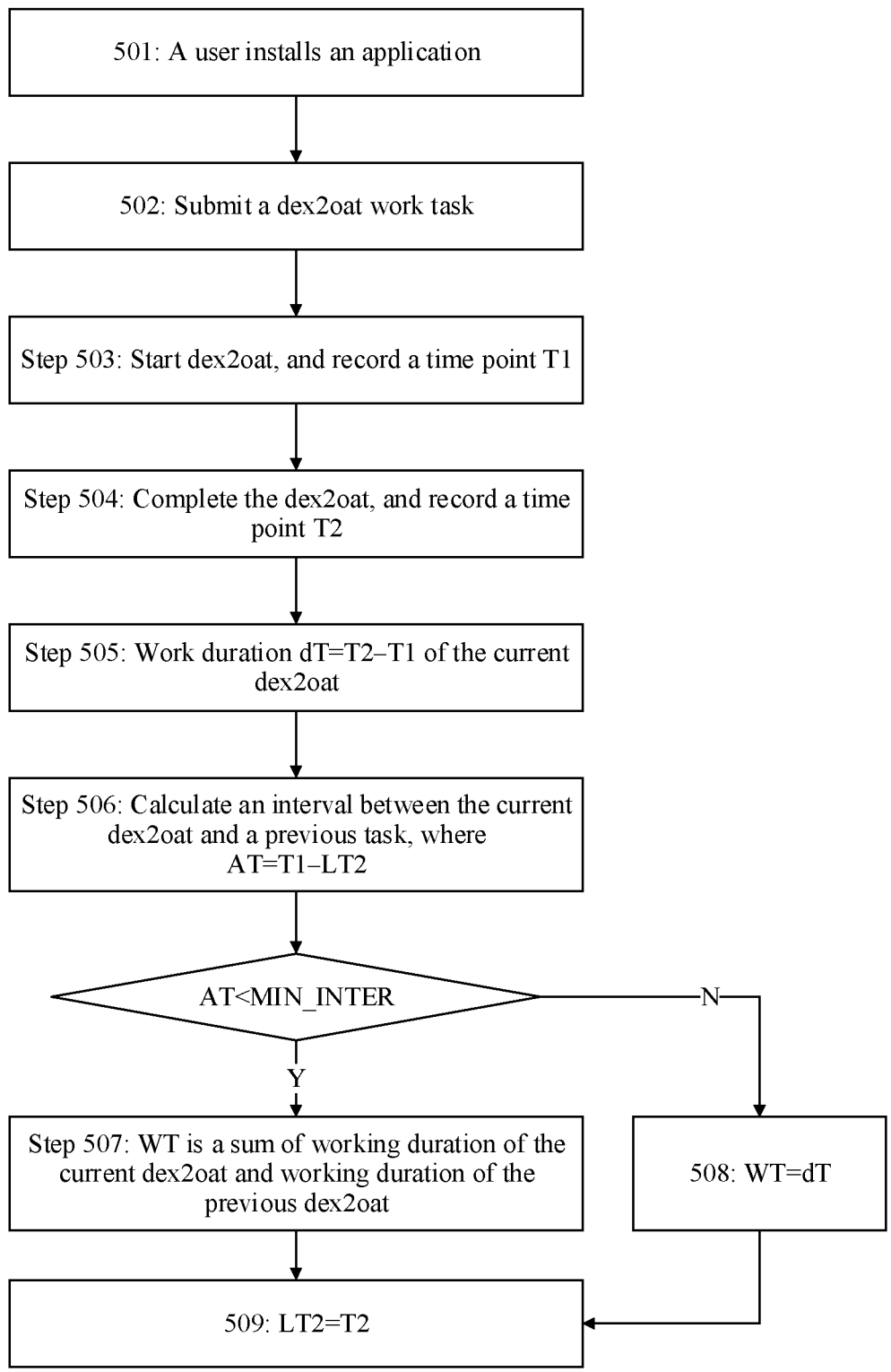
FIG. 12 is a schematic flowchart of counting a working time period of a dex2oat work task according to an embodiment of this application.

With reference to FIG. 12, the following describes a method for counting execution duration of a dex2oat work task in embodiments of this application.

FIG. 12 is a schematic flowchart of counting a working time period of the dex2oat work task according to an embodiment of this application. As shown in FIG. 12, the method may include Step 501 to Step 509.

Step 501: A user installs an application.

Step 502: Submit a dex2oat work task.

Step 503: Start to execute the dex2oat work task, and record a time point T1.

Step 504: Complete executing the dex2oat work task, and record a time point T2.

Step 505: Record execution duration of the current dex2oat work task, where dT=T2−T1.

Step 506: Calculate a time interval between the current dex2oat work task and a previous dex2oat work task, where AT=T1−LT2.

AT indicates the time interval between the current dex2oat work task and the previous dex2oat work task, and LT2 indicates a time point at which execution of the previous dex2oat work task is completed.

Step 507: If AT<MIN_INTER, the working time period WT of the dex2oat work task is a sum of a working time period of the current dex2oat work task and a working time period of the previous dex2oat work task.

WT indicates the working time period of the dex2oat work task, and MIN_INTER indicates a minimum time interval. It should be understood that the minimum time interval may be a preset value. For example, the minimum time interval may be 20 s, 30 s, or another value.

If the time interval AT between the current dex2oat work task and the previous dex2oat work task is less than or equal to the set minimum time interval MIN_INTER of the dex2oat work task, the work duration of the dex2oat work task is accumulated.

For example, as shown in FIG. 11, in a fifth time period t5 before a first application app 1 is copied and scanned, bottom-layer optimization dex2oat 0 is performed on a fourth application app 0. If at a moment T1, an interval between the fifth time period t5 in which dex2oat 0 is performed and a second time period in which dex2oat 1 is performed is less than or equal to the minimum time interval (namely, third preset duration), the working time period WT (namely, a fourth time period) of the dex2oat work task is a sum of duration of the fifth time period t5 and duration of the second time period t2.

Step 508: If AT>MIN_INTER, the working time period of the dex2oat work task is that WT=dT.

If the time interval AT between the current dex2oat work task and the previous dex2oat work task is greater than a set minimum time interval MIN_INTER of the dex2oat work task, the execution duration dT of the current dex2oat work task is used as the work duration of the dex2oat work task.

For example, at a moment T1 shown in FIG. 11, if an interval between a fifth time period t5 and a second time period t2 is greater than third preset duration, the working time period WT (a fourth time period) of the dex2oat work task is execution duration of dex2oat 1, namely, a first time period t1.

Step 509: LT2=T2.

When a next dex2oat work task starts, a time point at which execution of the current dex2oat work task is completed is used as LT2.

It should be understood that, for counting of work duration of next one or more dex2oat work tasks, refer to the foregoing steps. For brevity, details are not described again.

Figure 13:
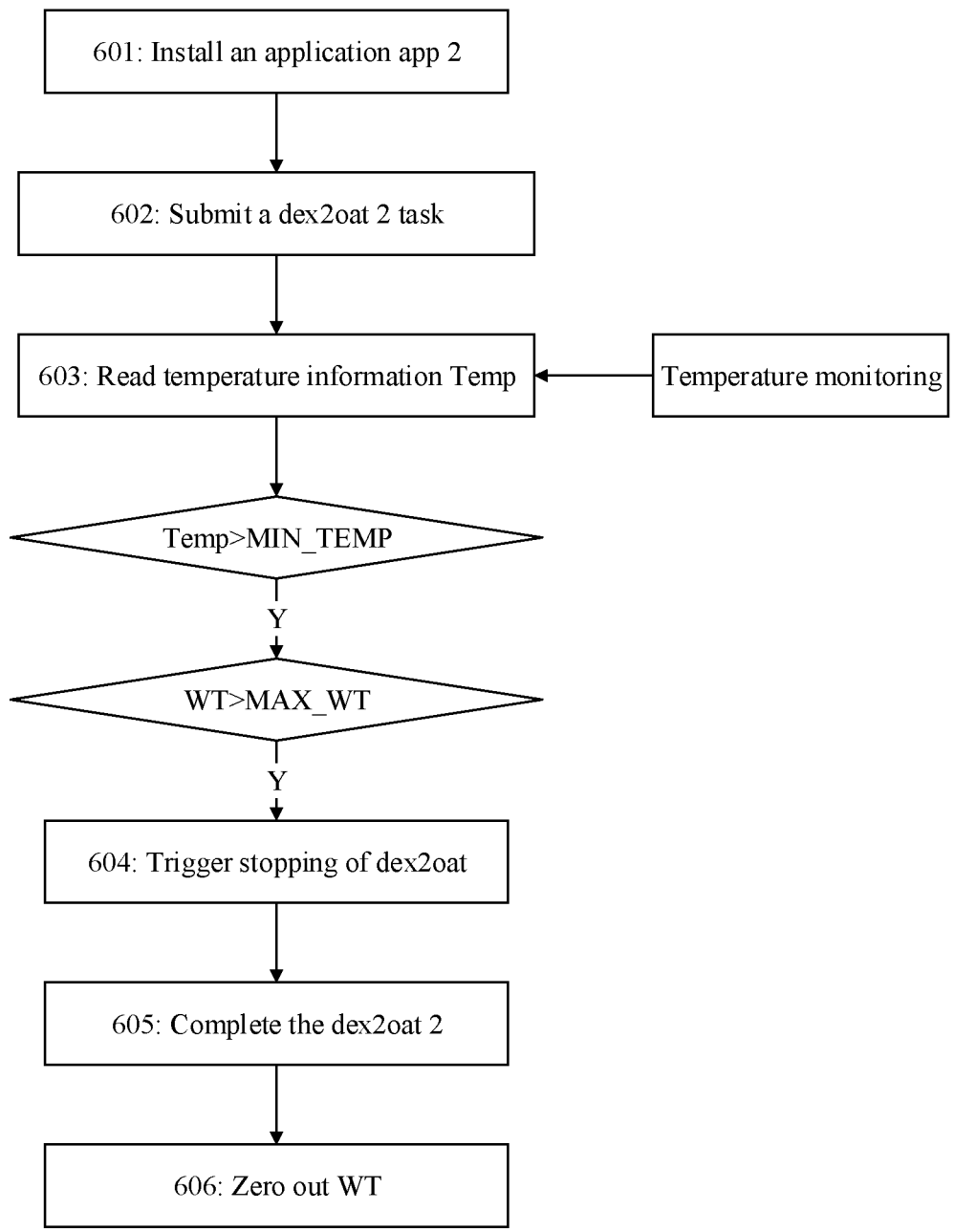
FIG. 13 is a schematic flowchart of optimizing and regulating a temperature control policy according to an embodiment of this application.

With reference to FIG. 13, the following describes a method for optimizing and regulating a temperature control policy according to embodiments of this application.

FIG. 13 is a schematic flowchart of optimizing and regulating the temperature control policy according to an embodiment of this application. As shown in FIG. 13, the method may include Step 601 to Step 606.

Step 601: Install an app 2.

It should be understood that, before Step 601, an app 1 has been installed at an upper layer, and in this step, installation of the app 2 at the upper layer and execution of a dex2oat work task at a bottom layer are performed in parallel.

Step 602: Submit the dex2oat work task.

Step 603: A system reads temperature information Temp based on a temperature monitoring result.

The system may monitor a temperature of an electronic device by using a temperature sensor, and the temperature may be an overall temperature of the electronic device, or may be a temperature of a CPU.

Step 604: Based on the temperature monitoring result in Step 603, trigger pausing of the dex2oat work task if the temperature of the electronic device is that Temp>MIN_TEMP and a working time period of the dex2oat work task is that WT>MAX_WT.

MIN_TEMP represents a threshold temperature, the threshold temperature is a critical temperature used to determine whether the temperature of the electronic device is abnormal when an application is installed, and MAX_WT is used to represent a maximum working time period. A value of MIN_TEMP and a value of MAX_WT may be preset by the system. As described above, MIN_TEMP may be any value between 35 degrees centigrade and 40 degrees centigrade, and MAX_WT may be any value between 20 s and 30 s.

It should be understood that WT in this embodiment of this application may be obtained by using the method for counting the working time period of the dex2oat work task in FIG. 10.

Although stopping of the dex2oat work task is triggered in Step 604, to avoid a stability problem that occurs in an application installation process, a dex2oat work task that is currently being executed is not immediately stopped. As described above, the dex2oat work task is stopped only after execution of dex2oat 2 of the app 2 is completed.

Step 605: Complete executing the dex2oat 2.

After execution of the dex2oat 2 is completed, the dex2oat work task stops for a period of time, to avoid a problem of insufficient stability of the electronic device caused by an excessively high temperature.

Step 606: Zero out WT.

When stopping of the dex2oat work task is triggered, the working time period WT of the dex2oat work task is zeroed out, to facilitate counting of a working time period of the dex2oat work task in a next cycle.

Based on the foregoing technical method, when applications are installed in batches, because there is high power consumption in a process of executing the dex2oat work task, the method for optimizing a temperature control policy in this embodiment of this application can avoid the problem of insufficient stability of the electronic device caused by the excessively high temperature.

Figure 14:
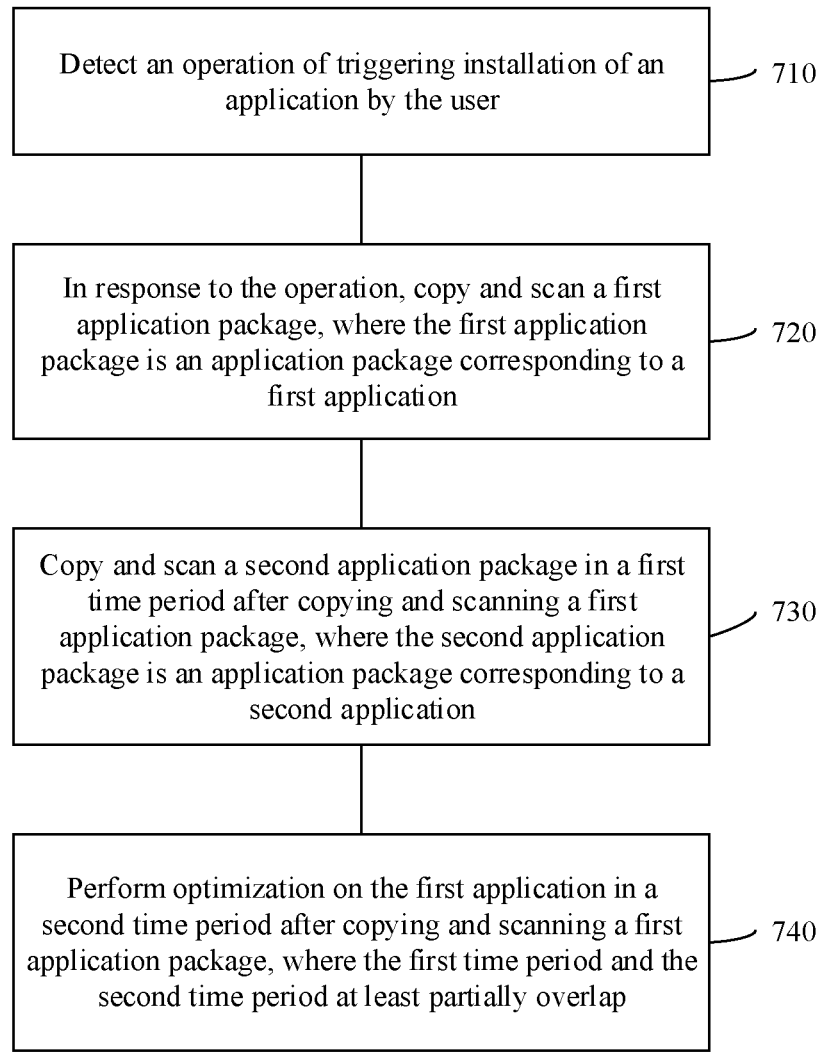
FIG. 14 is a schematic flowchart of an application installation method according to an embodiment of this application.

FIG. 14 is an example flowchart of an application installation method according to an embodiment of this application. As shown in FIG. 14, the method may include Step 710 to Step 740.

710: An electronic device detects an operation of triggering installation of an application by a user.

For example, the user downloads a plurality of applications from AppGallery and installs the plurality of applications at a time, or the user uses the electronic device to clone a plurality of applications for restoration, and clones the plurality of applications from one device to another device.

720: In response to the operation, copy and scan a first application package, where the first application package is an application package corresponding to a first application.

In response to the operation of the user, the electronic device copies and scans the first application package, that is, the first application is installed at an upper layer on the electronic device.

730: Copy and scan a second application package in a first time period after copying and scanning a first application package, where the second application package is an application package corresponding to a second application.

The first time period may start immediately after the electronic device scans and copies the first application package, or may start at an interval of a period of time after the electronic device scans and copies the first application package.

740: Perform optimization on the first application in a second time period after copying and scanning a first application package, where the first time period and the second time period at least partially overlap.

Optionally, a start time point of the first time period and a start time point of the second time period are the same, that is, upper-layer installation of the second application and bottom-layer optimization of the first application are performed at the same time.

Optionally, a start time point of the first time period and a start time point of the second time period are different. For example, the start time point of the first time period is later than the start time point of the second time period. In this case, the first application and the second application are installed at the upper layer on the electronic device at an interval of a period of time. This helps reduce a heating phenomenon of the electronic device.

In the foregoing embodiment, an example in which two applications are installed on the electronic device is used for description. However, this should not constitute any limitation on this application. It should be understood that, for a process of installing more applications, refer to the foregoing process.

Based on the application installation method in this embodiment of this application, an upper-layer installation process and a bottom-layer optimization process of an application are performed in parallel. This helps increase an installation speed of installing a plurality of applications on the electronic device, thereby improving user experience.

It may be understood that, to implement the foregoing functions, the electronic device includes corresponding hardware and/or software modules for performing the functions.

Algorithm steps in the examples described with reference to embodiments disclosed in this specification can be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application with reference to embodiments, but it should not be considered that the implementation goes beyond the scope of this application.

In this embodiment, the electronic device may be divided into function modules based on the foregoing method examples. For example, each function module corresponding to each function may be obtained through division, or two or more functions may be integrated into one processing module. The integrated module may be implemented in a form of hardware. It should be noted that, in this embodiment, division into the modules is an example, is merely logical function division, and may be other division during actual implementation.

An embodiment further provides a computer-readable storage medium. The computer-readable storage medium stores computer instructions. When the computer instructions are run on an electronic device, the electronic device is enabled to perform the foregoing related method steps, to implement the application installation method in the foregoing embodiments.

An embodiment further provides a computer program product. When the computer program product runs on a computer, the computer is enabled to perform the foregoing related steps, to implement the application installation method in the foregoing embodiments.

In addition, an embodiment of this application further provides an apparatus. The apparatus may be specifically a chip, a component, or a module. The apparatus may include a processor and a memory that are connected to each other. The memory is configured to store computer-executable instructions. When the apparatus runs, the processor may execute the computer-executable instructions stored in the memory, to enable the chip to perform the application installation method in the foregoing method embodiments.

The electronic device, the computer-readable storage medium, the computer program product, or the chip provided in embodiments is configured to perform the corresponding method provided above. Therefore, for beneficial effects that can be achieved, refer to the beneficial effects in the corresponding method provided above. Details are not described herein again.

Based on descriptions of the foregoing implementations, a person skilled in the art may understand that, for the purpose of convenient and brief description, division into the foregoing function modules is merely used as an example for description. During actual application, the foregoing functions can be allocated to different function modules and implemented based on a requirement, that is, an inner structure of an apparatus is divided into different function modules to implement all or some of the functions described above.

In the several embodiments provided in this application, it should be understood that the disclosed apparatuses and methods may be implemented in other manners. For example, the described apparatus embodiment is merely an example. For example, division into the modules or the units is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed in a plurality of different places. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a readable storage medium. Based on such an understanding, the technical solutions in embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip or the like) or a processor (processor) to perform all or some of the steps of the methods described in the embodiments of this application. The foregoing storage medium includes any medium that can store program code, for example, a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An application installation method, wherein the method is applied to an electronic device, and the method comprises:
    detecting a first user operation triggering installation of a first application and a second application;

in response to the first user operation, copying and scanning a first application package, wherein the first application package is an application package corresponding to the first application;

copying and scanning a second application package in a first time period after the copying and scanning the first application package, wherein the second application package is an application package corresponding to the second application;

performing optimization on the first application in a second time period after the copying and scanning the first application package, wherein the first time period and the second time period at least partially overlap;

detecting a second user operation triggering installation of a third application and a fourth application; and copying and scanning a third application package in a third time period after the copying and scanning the first application package; wherein the third application package is an application package corresponding to the third application; and when a duration of the second time period is greater than a sum of a duration of the first time period and a duration of the third time period, a start moment at which a fourth application package is copied and scanned is later than or equal to a start moment at which optimization is performed on the second application.

2. The method according to claim 1, wherein the method further comprises:

detecting a third user operation of triggering installation of a third application;

when copying and scanning of the second application package are completed, detecting a temperature of a central processing unit (CPU) of the electronic device;

determining that the temperature is greater than or equal to a preset value;

pausing for a first preset duration when optimization of the second application ends; and copying and scanning a third application package after the first preset duration, wherein the third application package is an application package corresponding to the third application.

3. The method according to claim 2, wherein before the performing optimization on the first application, optimization is performed on a fourth application, and the determining that the temperature is greater than or equal to the preset value comprises:

determining that the temperature is greater than or equal to the preset value and that a duration of a fourth time period is greater than or equal to a second preset duration, wherein the fourth time period is the same as the second time period; or a time interval between the second time period and a fifth time period is less than or equal to a third preset duration, the fourth time period is a sum of the second time period and the fifth time period, and the fifth time period is a time period in which the electronic device performs optimization on the fourth application.

4. The method according to claim 1, wherein the performing optimization on the first application comprises:

adding a first optimization task to a first task queue, wherein the first optimization task optimizes the first application;

starting a first thread, wherein the first thread fetches the first optimization task from the first task queue; and invoking a first interface, wherein the first interface starts a second thread, and the second thread executes the first optimization task.

5. An electronic device, comprising:

one or more processors; and one or more memories, wherein the one or more memories store one or more computer programs, the one or more computer programs comprise instructions, and when the instructions are executed by the one or more processors, the electronic device is enabled to perform the following steps:

detecting a first user operation triggering installation of a first application and a second application;

in response to the first user operation, copying and scanning a first application package, wherein the first application package is an application package corresponding to the first application;

copying and scanning a second application package in a first time period after the copying and scanning the first application package, wherein the second application package is an application package corresponding to the second application;

performing optimization on the first application in a second time period after the copying and scanning the first application package, wherein the first time period and the second time period at least partially overlap;

detecting a second user operation triggering installation of a third application and a fourth application; and copying and scanning a third application package in a third time period after the copying and scanning the first application package; wherein the third application package is an application package corresponding to the third application;

when a duration of the second time period is greater than a sum of a duration of the first time period and a duration of the third time period, a start moment at which a fourth application package is copied and scanned is later than or equal to a start moment at which optimization is performed on the second application.

6. The electronic device according to claim 5, wherein when the instructions are executed by the one or more processors, the electronic device is enabled to perform the following steps:

detecting a third user operation of triggering installation of a third application;

when copying and scanning of the second application package are completed, detecting a temperature of a central processing unit (CPU) of the electronic device;

determining that the temperature is greater than or equal to a preset value;

pausing for a first preset duration when optimization of the second application ends; and copying and scanning a third application package after the first preset duration, wherein the third application package is an application package corresponding to the third application.

7. The electronic device according to claim 6, wherein before the performing optimization on the first application, optimization is performed on a fourth application, and the electronic device is specifically configured to:

determine that the temperature is greater than or equal to the preset value and that a duration of a fourth time period is greater than or equal to a second preset duration, wherein the fourth time period is the same as the second time period; or when a time interval between the second time period and a fifth time period is less than or equal to a third preset duration, the fourth time period is a sum of the second time period and the fifth time period, and the fifth time period is a time period in which the electronic device performs optimization on the fourth application.

8. The electronic device according to claim 5, wherein the electronic device is specifically configured to:
add a first optimization task to a first task queue, wherein the first optimization task optimizes the first application;
start a first thread, wherein the first thread fetches the first optimization task from the first task queue; and
invoke a first interface, wherein the first interface starts a second thread, and the second thread is used to execute the first optimization task.

9. A non-transitory computer-readable storage medium, wherein the computer-readable storage medium stores computer instructions, and when the computer instructions are run on an electronic device, the electronic device is enabled to perform:
detecting a first user operation of triggering installation of a first application and a second application;
in response to the first user operation, copying and scanning a first application package, wherein the first application package is an application package corresponding to the first application;
copying and scanning a second application package in a first time period after the copying and scanning the first application package, wherein the second application package is an application package corresponding to the second application;
performing optimization on the first application in a second time period after the copying and scanning the first application package, wherein the first time period and the second time period at least partially overlap;
detecting a second user operation triggering installation of a third application and a fourth application; and
copying and scanning a third application package in a third time period after the copying and scanning the first application package; wherein
the third application package is an application package corresponding to the third application; and
when a duration of the second time period is greater than a sum of a duration of the first time period and a duration of the third time period, a start moment at which a fourth application package is copied and scanned is later than or equal to a start moment at which optimization is performed on the second application.

10. The non-transitory computer-readable storage medium according to claim 9, wherein when the computer instructions are run on an electronic device, the electronic device is further enabled to perform:
detecting a third user operation of triggering installation of a third application;
when copying and scanning of the second application package are completed, detecting a temperature of a central processing unit (CPU) of the electronic device;
determining that the temperature is greater than or equal to a preset value;
pausing for a first preset duration when optimization of the second application ends; and
copying and scanning a third application package after the first preset duration, wherein the third application package is an application package corresponding to the third application.

11. The non-transitory computer-readable storage medium according to claim 10, wherein before the performing optimization on the first application, optimization is performed on a fourth application, and the determining that the temperature is greater than or equal to the preset value comprises:
determining that the temperature is greater than or equal to the preset value and that a duration of a fourth time period is greater than or equal to a second preset duration, wherein
the fourth time period is the same as the second time period; or
a time interval between the second time period and a fifth time period is less than or equal to a third preset duration, the fourth time period is a sum of the second time period and the fifth time period, and the fifth time period is a time period in which the electronic device performs optimization on the fourth application.

12. The non-transitory computer-readable storage medium according to claim 9, wherein the performing optimization on the first application comprises:
adding a first optimization task to a first task queue, wherein the first optimization task optimizes the first application;
starting a first thread, wherein the first thread fetches the first optimization task from the first task queue; and
invoking a first interface, wherein the first interface starts a second thread, and the second thread executes the first optimization task.

* * * * *